United States Patent
Nagaraja et al.

(10) Patent No.: US 8,577,378 B2
(45) Date of Patent: Nov. 5, 2013

(54) METHOD AND APPARATUS FOR FACILITATING A BEACON-ASSISTED HANDOVER TO A HOME NODE-B FOR USERS ON AN ACTIVE CALL

(75) Inventors: Sumeeth Nagaraja, San Diego, CA (US); Mehmet Yavuz, San Diego, CA (US); Farhad Meshkati, San Diego, CA (US); Andrei D. Radulescu, San Diego, CA (US); Christophe Chevallier, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 12/697,040

(22) Filed: Jan. 29, 2010

(65) Prior Publication Data

US 2010/0203890 A1  Aug. 12, 2010

Related U.S. Application Data

(60) Provisional application No. 61/151,471, filed on Feb. 10, 2009, provisional application No. 61/187,228, filed on Jun. 15, 2009.

(51) Int. Cl.
*H04W 36/00* (2009.01)
*H04W 4/00* (2009.01)

(52) U.S. Cl.
USPC .............. 455/444; 45/443; 45/436; 45/432.1; 370/331

(58) Field of Classification Search
USPC ............ 455/432.1–449, 161.2, 161.3, 550.1, 455/552.1, 553.1, 556.1, 560, 561, 455/418–422.1; 370/310.2, 338, 326, 370/328–333, 335, 336, 341–356, 319, 320, 370/324
See application file for complete search history.

(56) References Cited

U.S. PATENT DOCUMENTS

| | | | |
|---|---|---|---|
| 5,778,075 A | | 7/1998 | Haartsen |
| 5,870,673 A | * | 2/1999 | Haartsen .................... 455/426.1 |
| 6,697,629 B1 | * | 2/2004 | Grilli et al. ................. 455/456.1 |
| 7,412,240 B2 | | 8/2008 | Hunkeler |
| 7,613,444 B2 | | 11/2009 | Lindqvist et al. |
| 8,208,933 B1 | * | 6/2012 | Talley et al. .................. 455/446 |

(Continued)

FOREIGN PATENT DOCUMENTS

| | | |
|---|---|---|
| EP | 2048901 | 4/2009 |
| JP | 2012501104 A | 1/2012 |

OTHER PUBLICATIONS

3GPP TS 25.367 V. 1.0.0 (Dec. 2008) "3rd Generation Partnership Project;Technical Specification Group Radio Access Network;Mobility Procedures for Home NodeB;Overall Description; Stage 2(Release 8)" 3GPP Draft; R2-087449 Stage 2, Mobile Competence Centre ; 650, Route Des Lucioles ; F-06921 Sophia-Antipolis Cedex ; France, no. Prague, Czech Republic; 20081127, XP050321951 [retrieved on Nov. 27, 2008] paragraph [3.1 Definitions] paragraph [4 Overview] paragraph [5 CSG Identification] paragraph [CSG Cell Handover]. (pp. 2-10).

(Continued)

*Primary Examiner* — San Htun

(57) ABSTRACT

Methods, apparatuses, and computer program products are disclosed for facilitating a beacon-assisted handover from a macro network to a femto cell during an active call. A femto cell management system assigns a unique identifier to a femto cell, which the femto cell utilizes to broadcast a beacon at a frequency different than the operating frequency of the femto cell. A wireless terminal receives a control message from the macro network directing the wireless terminal to scan particular frequencies. The wireless terminal subsequently provides a report to the macro network identifying attributes ascertained from the scan, which includes attributes associated with the beacon. The macro network then performs a handover from the macro network to the femto cell as a function of the attributes.

22 Claims, 20 Drawing Sheets

(56) References Cited

U.S. PATENT DOCUMENTS

| | | | | |
|---|---|---|---|---|
| 2004/0248602 | A1* | 12/2004 | Demir et al. | 455/502 |
| 2007/0140185 | A1* | 6/2007 | Garg et al. | 370/338 |
| 2008/0080439 | A1* | 4/2008 | Aziz et al. | 370/338 |
| 2008/0095108 | A1* | 4/2008 | Malladi et al. | 370/329 |
| 2008/0205341 | A1 | 8/2008 | Koh et al. | |
| 2009/0047955 | A1* | 2/2009 | Frenger et al. | 455/436 |
| 2010/0113035 | A1* | 5/2010 | Eskicioglu et al. | 455/444 |

OTHER PUBLICATIONS

International Search Report and Written Opinion—PCT/US2010/023679, International Search Authority—European Patent Office—Jun. 30, 2010.

Samsung: "Consideration for Co-channel Interference Mitigation between Home Node B and Macro Cell" 3GPP Draft; R4-071529, 3rd Generation Partnership Project (3GPP), Mobile Competence Centre ; 650, Route Des Lucioles ; F-06921 Sophia-Antipolis Cedex ; France, vol. RAN WG4, no. Shanghai, China; 20071016, Oct. 16, 2007, XP050177972 [retrieved on Oct. 16, 2007] the whole document.

Vodafone Group et al: "Merged Text Proposals for TR 25.9xx—Home NodeB RF" 3GPP Draft; R4-082623, 3rd Generation Partnership Project (3GPP), Mobile Competence Centre ; 650, Route Des Lucioles ; F-06921 Sophia-Antipolis Cedex ; France, no. Scotland; 20081003, Oct. 3, 2008, XP050325856.

Taiwan Search Report—TW099103842—TIPO—Mar. 17, 2013.

* cited by examiner

METHOD AND APPARATUS FOR FACILITATING A BEACON-ASSISTED HANDOVER TO A HOME NODE-B FOR USERS ON AN ACTIVE CALL

CROSS-REFERENCE TO RELATED APPLICATIONS

This application claims the benefit of U.S. Provisional Patent application Ser. No. 61/151,471 entitled "Method and Apparatus to Enable Beacon-Assisted Handover to a Home NodeB for UTRAN/UMTS Users in Active Call," which was filed Feb. 10, 2009, and U.S. Provisional Patent application Ser. No. 61/187,228 entitled "Method and Apparatus to Enable Beacon-Assisted Handover to a Home NodeB for UTRAN/UMTS Users in Active Call," which was filed Jun. 15, 2009. The aforementioned applications are herein incorporated by reference in their entirety.

BACKGROUND

I. Field

The following description relates generally to wireless communications, and more particularly to methods and apparatuses for facilitating a beacon-assisted handover to a femto cell for users on an active call.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_s$ independent channels, which are also referred to as spatial channels, where $N_s$ min $\{N_T, N_R\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In cellular networks, Macro Node Bs (MNBs) provide connectivity and coverage to a large number of users over a certain geographical area. A macro network deployment is carefully planned, designed and implemented to offer good coverage over the geographical region. While, such a careful planning is necessary, it however, cannot accommodate channel characteristics such as fading, multipath, shadowing, etc. especially in indoor environments. Indoor users, therefore, often face coverage issues (call outages, quality degradation) resulting in poor user experience.

Miniaturized base stations known as femto cells or Home Node Bs (HNBs) are expected to address this issue by extending cellular coverage inside buildings. Femto cells are a new class of base stations, which may be installed in a user's home and provide indoor wireless coverage to mobile units using existing broadband Internet connections.

However, an unplanned deployment of large numbers of HNBs will likely create several challenges that need addressing. For instance, when a mobile user gets close to a femto cell (e.g., cellular subscriber coming home), it may be desirable to enable a handover to that particular femto cell. It may be difficult though to uniquely identify the femto cell to facilitate such a handover. Typically in a macro network, identification of MNBs is achieved by assigning a unique primary scrambling code (PSC) to an MNB in a certain coverage area. However, this is not feasible in femto cell deployments due to the limited number of PSCs that are allocated and reused and small scale coverage of HNBs compared to MNBs. Therefore, using PSCs for HNB identification would result in ambiguities during an active hand-in procedure, wherein false HNB identification would result in severe network performance degradation.

Another challenge is detection of femto cell coverage when multiple frequencies (f1, f2, . . . , fn) are used in a UMTS-Femto Cell network deployment. A wireless terminal in an active call with a macro radio network controller (RNC) on one frequency, for instance f1, may not detect the presence of HNBs on other frequencies (f2, f3, . . . , fn) even when there is good coverage provided by HNBs on those frequencies. Thus, a wireless terminal in a femto cell coverage area undesirably remains connected to the macro network. The wireless terminal would thus never detect the presence of femto cell network coverage and would therefore not be able to leverage its benefits. Such scenarios may result in a poor user-experience and unused HNB capacity.

Accordingly, it would be desirable to develop a method and apparatus for efficiently detecting and identifying femto cell coverage during an active communication facilitated by a macro network.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating a beacon-assisted handover to a femto cell for users on an active call. In one aspect, methods and computer program products are disclosed for facilitating a beacon-assisted handover from a wireless terminal. Within such embodiments, a control message is received during an active communication with a base station in which the active communication is facilitated by a macro network. A frequency identified in the control message and associated with a beacon transmitted by a femto cell is then scanned by the wireless terminal A report is then transmitted to the base station, which includes an attribute associated with the beacon.

In another aspect, an apparatus for facilitating a beacon-assisted handover from a wireless terminal is disclosed. Within such embodiment, the apparatus includes a processor configured to execute computer executable components stored in memory. The computer executable components include a receiving component, a scanning component, and a transmitting component. The receiving component is configured to receive a control message during an active communication with a base station in which the active communication is facilitated by a macro network. The scanning component is configured to scan a frequency identified in the control message and associated with a beacon transmitted by a femto cell. For this embodiment, the frequency associated with the beacon is different than an operating frequency of the femto cell. The transmitting component is then configured to transmit a report to the base station, which includes an attribute associated with the beacon.

In a further aspect, another apparatus is disclosed. Within such embodiment, the apparatus includes means for receiving a control message, means for scanning, and means for transmitting. For this embodiment, a control message is received during an active communication with a base station in which the active communication is facilitated by a macro network via the base station. The means for scanning includes means for scanning a frequency identified in the control message, wherein the frequency is associated with a beacon transmitted by a femto cell. The means for transmitting includes means for transmitting a report to the base station that includes an attribute associated with the beacon.

In another aspect, methods and computer program products are disclosed for facilitating a beacon-assisted handover from a femto cell. Within such embodiments, an initialization message is received that includes a unique identifier associated with the femto cell. The femto cell is then operated at a first frequency as a function of the unique identifier. At least one beacon signal is then broadcast at a second frequency different than the first frequency, in which the at least one beacon signal is broadcast according to the unique identifier.

An apparatus for facilitating a beacon-assisted handover from a femto cell is also disclosed. Within such embodiment, the apparatus includes a processor configured to execute computer executable components stored in memory. The computer executable components include a receiving component, an operating component, and a transmitting component. The receiving component is configured to receive an initialization message, which includes a unique identifier associated with the femto cell. The operating component is configured to operate the femto cell at a first frequency as a function of the unique identifier. The transmitting component is then configured to broadcast at least one beacon signal at a second frequency different than the first frequency, in which the at least one beacon signal is broadcast according to the unique identifier.

In a further aspect, another apparatus is disclosed. Within such embodiment, the apparatus includes means for receiving an initialization message, means for operating, means for broadcasting, and means for detecting a wireless terminal. For this embodiment, an initialization message is received that includes a unique identifier associated with a femto cell. The means for operating includes means for operating the femto cell at a first frequency, wherein the femto cell is operated as a function of the unique identifier. The means for broadcasting includes means for broadcasting at least one beacon signal, wherein the at least one beacon signal is broadcast at a second frequency different than the first frequency, and wherein the at least one beacon signal is broadcast according to the unique identifier. A wireless terminal is also detected in which a potential interference with the wireless terminal is mitigated by controlling the at least one beacon signal.

In other aspects, methods and computer program products are disclosed for managing a beacon-assisted handover. Within such embodiments, a communication is received from a femto cell in which a unique identifier is assigned to the femto cell as a function of the communication. For this embodiment, the unique identifier identifies an initialization parameter associated with broadcasting a beacon signal from the femto cell. The unique identifier is then transmitted to the femto cell.

An apparatus for managing a beacon-assisted handover is also disclosed. Within such embodiment, the apparatus includes a processor configured to execute computer executable components stored in memory. The computer executable components include a receiving component, an assignment component, and a transmitting component. The receiving component is configured to receive a communication from a femto cell, whereas the assignment component is configured to assign a unique identifier to the femto cell as a function of the communication. For this embodiment, the unique identifier identifies an initialization parameter associated with broadcasting a beacon signal from the femto cell. The transmitting component is then configured to transmit the unique identifier to the femto cell.

In a further aspect, another apparatus is disclosed. Within such embodiment, the apparatus includes means for receiving a communication, means for assigning a unique identifier, and means for transmitting the unique identifier. For this embodiment, a communication is received from a femto cell. A unique identifier is identified to the femto cell as a function of the communication in which the unique identifier identifies an initialization parameter associated with broadcasting a beacon signal from the femto cell. The unique identifier is then transmitted to the femto cell.

In yet another aspect, methods and computer program products are disclosed for facilitating a beacon-assisted handover from a macro network. Within such embodiments, a control message is generated that directs a wireless terminal to scan a frequency associated with a beacon transmitted by a femto cell. For this embodiment, the frequency is different than an operating frequency of the femto cell. The control message is then transmitted to the wireless terminal and a report is subsequently received from the wireless terminal that includes at least one beacon attribute. A detection and identification of the femto cell is then ascertained based on the at least one beacon attribute, in which a handover to the femto cell is facilitated by the identification.

An apparatus for facilitating a beacon-assisted handover from a macro network is also disclosed. Within such embodiment, the apparatus includes a processor configured to execute computer executable components stored in memory. The computer executable components include a message generation component, a transmitting component, a receiving component, a detection component, and an identification component. The message generation component is configured to generate a control message that directs a wireless terminal to scan a frequency associated with a beacon transmitted by a femto cell. For this embodiment, the frequency is different than an operating frequency of the femto cell. The transmitting component is configured to transmit the control message to the wireless terminal, whereas the receiving component is configured to receive a report from the wireless terminal that includes at least one beacon attribute. The detection component is configured to ascertain a detection of the femto cell based on the at least one beacon attribute. The identification component is then configured to ascertain an identification of the femto cell based on the at least one beacon attribute, in which a handover to the femto cell is facilitated by the identification.

In a further aspect, another apparatus is disclosed. Within such embodiment, the apparatus includes means for generating a control message, means for transmitting the control message, means for receiving a report, means for ascertaining a detection, means for determining an identification, and means for directing. For this embodiment, a control message is generated that directs a wireless terminal to scan a frequency associated with a beacon transmitted by a femto cell, wherein the frequency is different than an operating frequency of the femto cell, the control message is transmitted to the wireless terminal. A report is received from the wireless terminal that includes at least one beacon attribute. A detection of the femto cell is ascertained based on the at least one beacon attribute. An identification of the femto cell is ascertained based on the at least one beacon attribute, wherein a handover to the femto cell is facilitated by the identification. A wireless terminal is also directed to perform the scan on the operating frequency of the femto cell, wherein the report further includes a femto cell attribute, and wherein at least one of the detection or the identification is based on the femto cell attribute.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
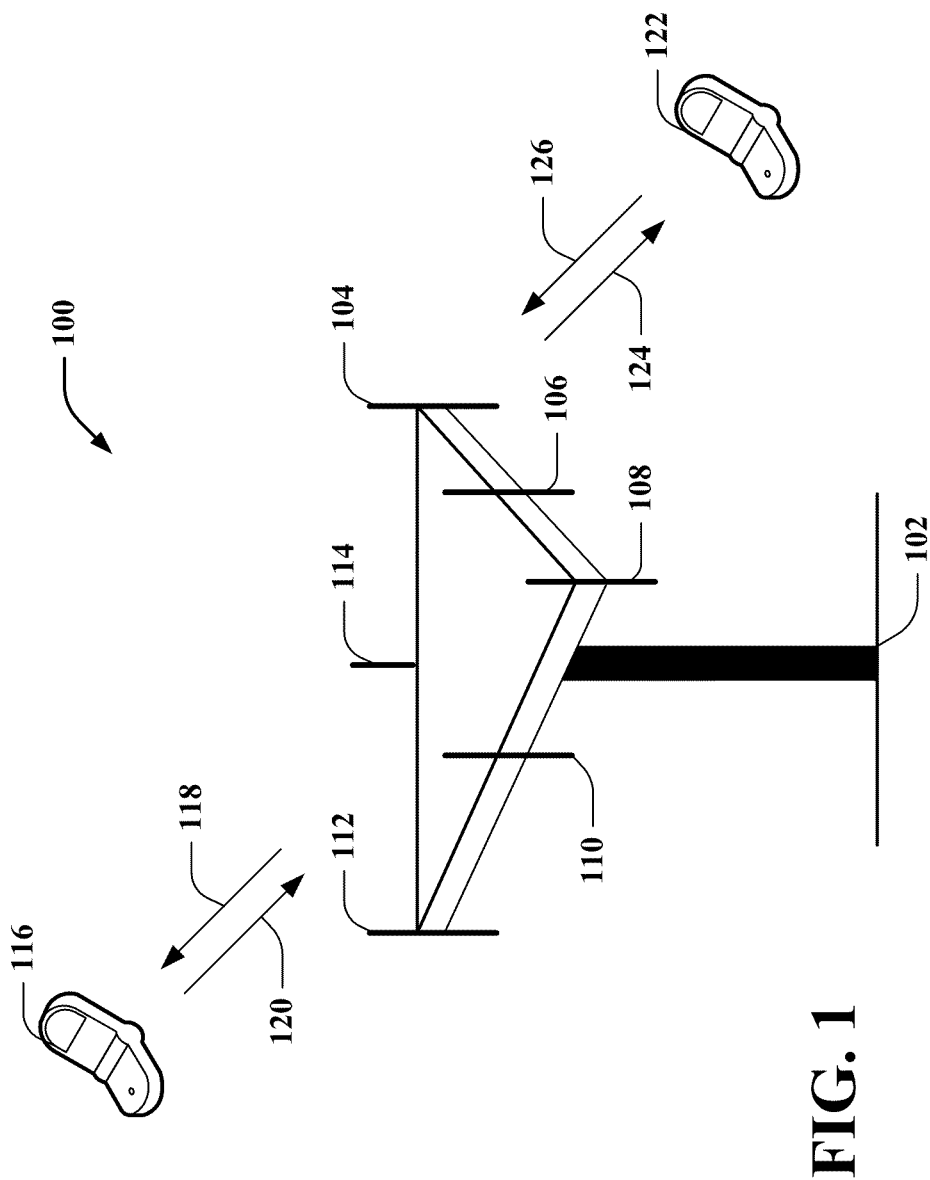
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification discloses a method and apparatus that employs beacons to address the aforementioned issues regarding identifying and detecting HNBs in UMTS-Femtocell networks. In an aspect, HNBs transmit beacons on different frequencies (f2, fn) that facilitate detection of HNBs. Furthermore, identification of HNBs is achieved by assigning unique identification attributes. For instance, in an embodiment, the HNB identification attributes are tuples taken from the cross product of a set of spreading sequences assigned to HNBs, beacons and a set of system frame number (SFN) offsets. Wireless terminal reports to the MNB include the HNB identification attributes, which the method retrieves to uniquely identify HNBs. In an aspect, the method resides in a femto cell management system, wherein the proposed approaches are also applicable to legacy UEs.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
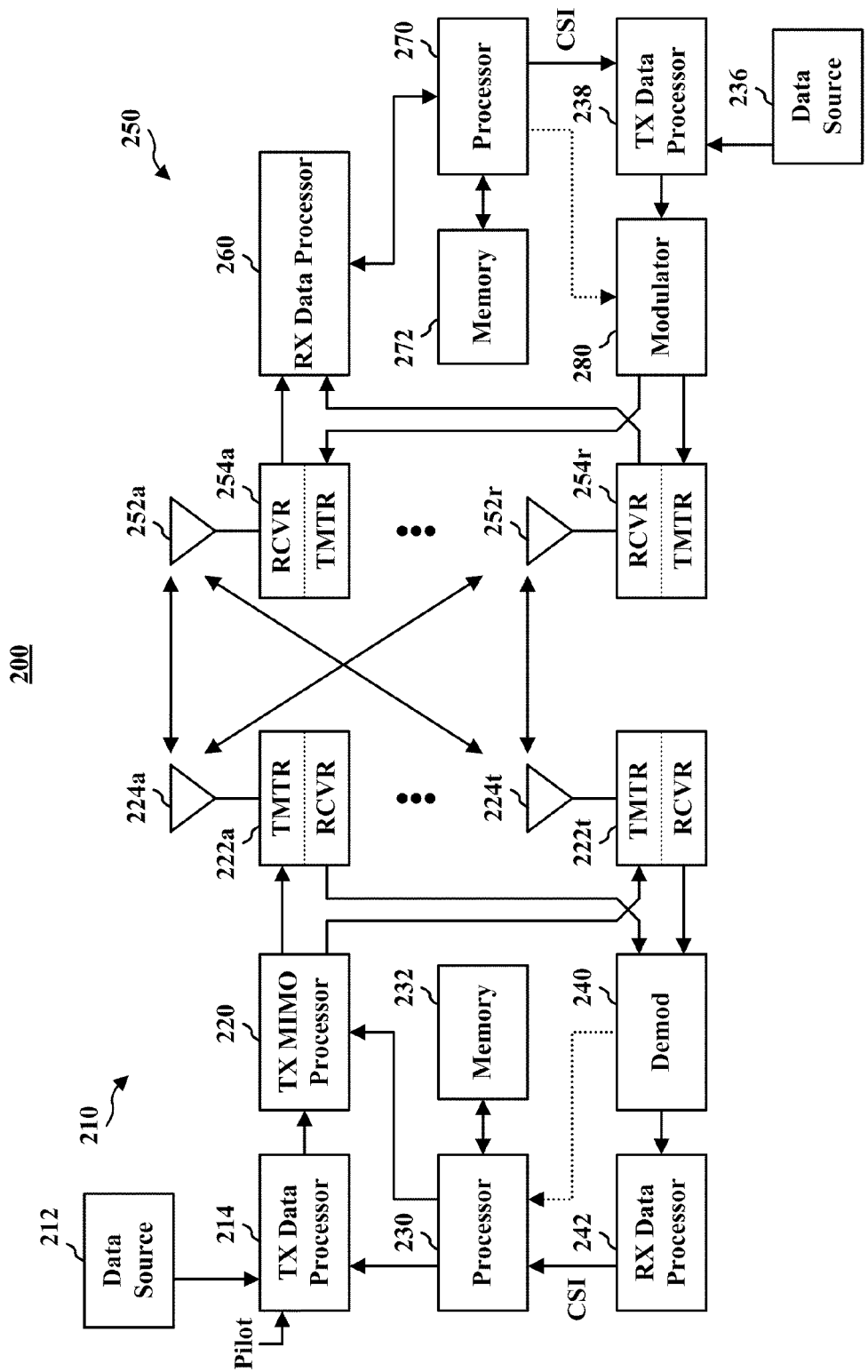
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
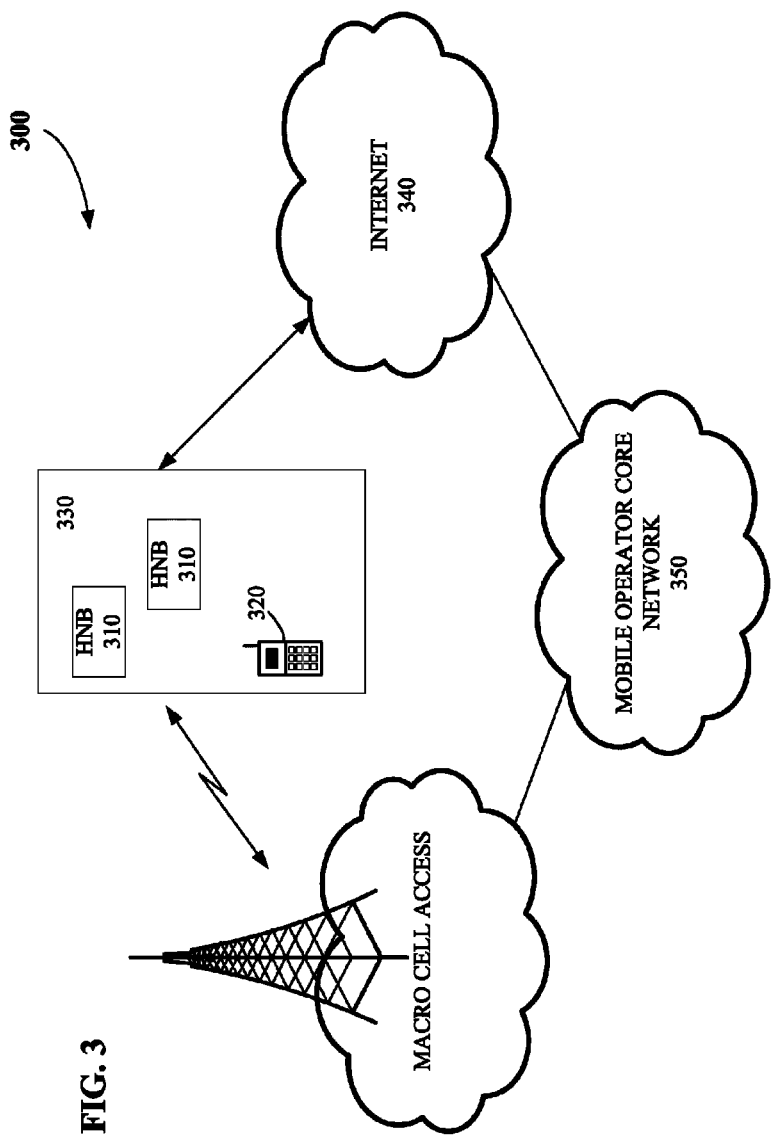
FIG. 3 illustrates an exemplary communication system that enables deployment of access point base stations within a network environment.

FIG. 3 illustrates an exemplary communication system to enable deployment of access point base stations within a network environment. As shown in FIG. 3, the system 300 includes multiple access point base stations or, in the alternative, femto cells, Home Node B units (HNBs), or Home evolved Node B units (HeNBs), such as, for example, HNBs 310, each being installed in a corresponding small scale network environment, such as, for example, in one or more user residences 330, and being configured to serve associated, as well as alien, user equipment (UE) or mobile stations 320. Each HNB 310 is further coupled to the Internet 340 and a mobile operator core network 350 via a DSL router (not shown) or, alternatively, a cable modem (not shown).

Figure 4:
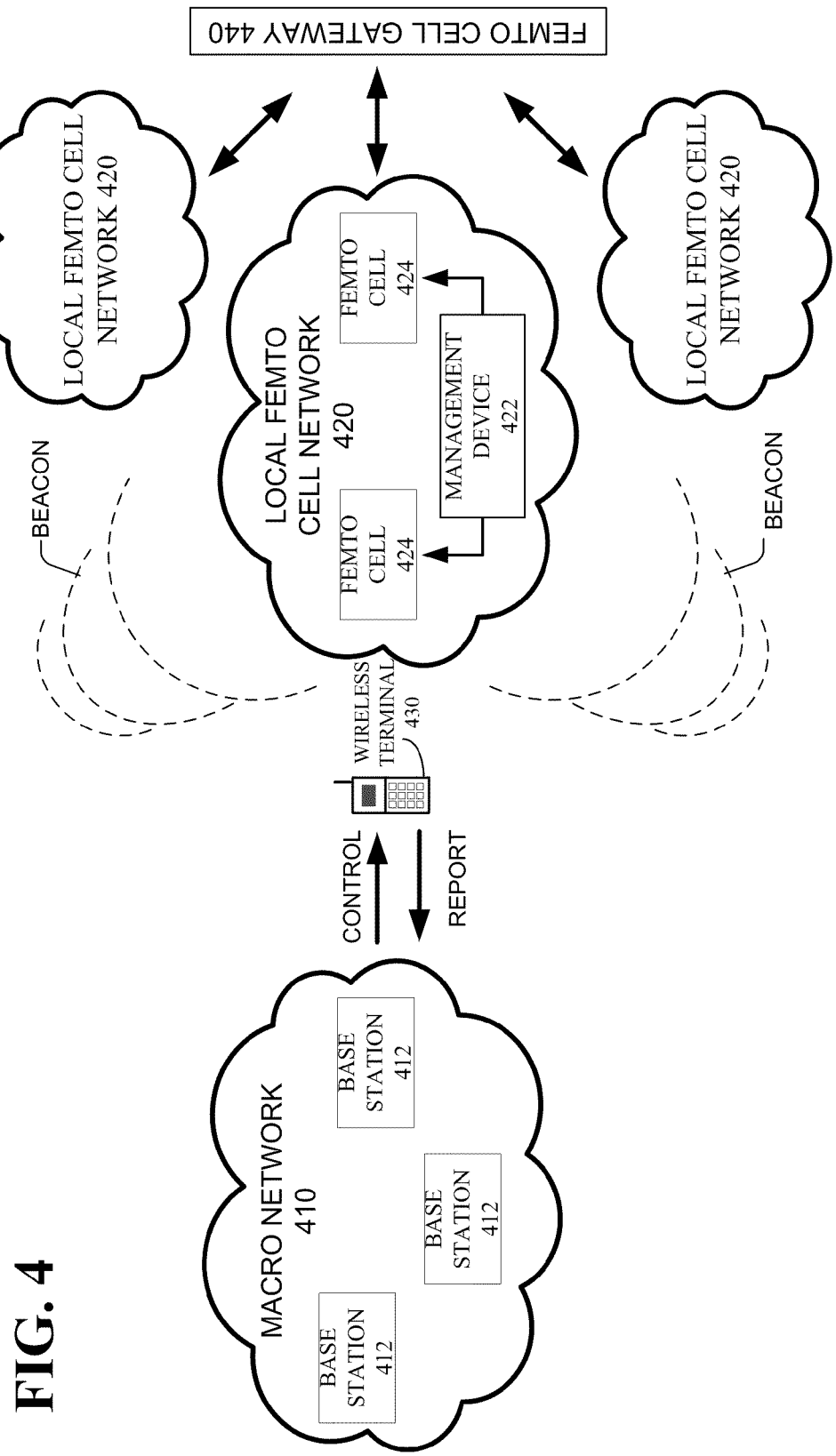
FIG. 4 is an overview of an exemplary system for facilitating a beacon-assisted handover in accordance with an aspect of the subject specification.

Referring next to FIG. 4, an overview of an exemplary system for facilitating a beacon-assisted handover in accordance with an aspect of the subject specification is provided. As illustrated, system 400 includes macro network 410, local femto cell networks 420, wireless terminal 430, and femto cell gateway 440. Within such embodiment, macro network 410 includes a plurality of base stations 412, wherein macro network 410 may facilitate an active communication (e.g., voice, data, etc.) with wireless terminal 430 via any of base stations 412. During the active communication, macro network 410 provides wireless terminal 430 with a control message, which directs wireless terminal 430 to scan for cells within a neighbor cell list including femto cells 424 within any of local femto cell networks 420. Based on macro network settings set by the control message, wireless terminal 430 then provides reports to macro network 410 indicating particular attributes and/or measurements associated with those signals, which macro network 430 subsequently uses to determine whether a beacon broadcast from one of femto cells 424 has been detected. To facilitate such detection, because a beacon is similar to a cell, the control message sent by macro network 410 includes beacons within the neighbor cell list. In an embodiment, based on the primary scrambling code (PSC) reported by wireless terminal 430, macro network 430 knows whether the reported cell is actually a beacon. Here, it should thus be noted that wireless terminal 430 may report the presence of a cell (e.g., a beacon) to macro network 410 via standard measurement report messages such as Event 1a.

As illustrated, local femto cell networks 420 communicate with femto cell gateway 440 and respectively include management device 422 and a plurality of femto cells 424. In an aspect, either of management device 422 and/or femto cell gateway 440 is configured to assign identifiers to femto cells 424, which femto cells 424 may then use to facilitate identifying themselves via their respective beacons. For instance, femto cells 424 may be configured to transmit beacons on different macro frequencies (f1, f2, ..., fn), wherein a beacon may be transmitted over any of a plurality of channels. A few PSCs may also be reserved for the beacon transmission.

Figure 5:
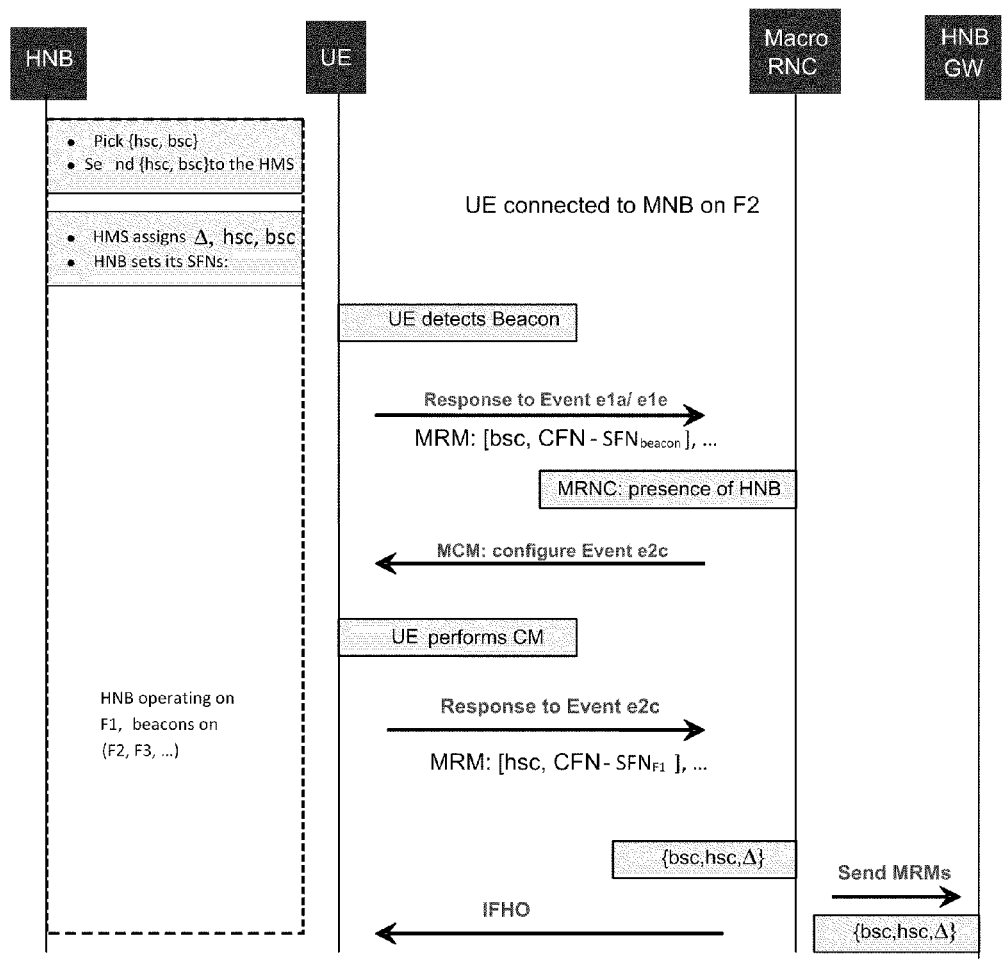
FIG. 5 illustrates an exemplary procedure for facilitating a beacon-assisted handover in accordance with an aspect of the subject specification.

Referring next to FIG. 5, an exemplary procedure for facilitating a beacon-assisted handover in accordance with an aspect of the subject specification is provided. In the discussion that follows, the exemplary procedure illustrated in FIG. 5 is briefly summarized.

With respect to detecting femto cells, the procedure includes the following steps. First, a macro radio network controller (RNC) includes HNB PSC's in the neighbor cell list (NCL) of a measurement control message (MCM) sent to the UE. The UE then takes intra-frequency measurements on the HNBs in the NCL and sends a measurement report message (MRM) to the macro RNC. In an embodiment, upon receiving an MRM (e.g., Event 1a) that indicates detection of an HNB PSC, the macro RNC employs either an immediate trigger inter-frequency handover (IFHO) or a compressed mode IFHO.

For an immediate trigger IFHO, the macro RNC first ascertains the contents of the received MRM. In an aspect, if the MRM includes, for example, Event 1a, Event 1c, or Event 1e for the HNB PSCs, the macro RNC enables IFHO. In another embodiment, the macro RNC may wait for a particular number of events (e.g., Event 1a, Event 1c, and/or Event 1e) to be reported by the UE before triggering IFHO.

For a compressed mode trigger IFHO, the macro RNC again begins by ascertaining the contents of the received MRM. Here, however, if the MRM includes, for example, Event 1a, Event 1c, or Event 1e for the HNB PSCs, the macro RNC sends a subsequent MCM to the UE configuring Event 2C. The UE then scans the HNB operating frequency and sends an MRM to the macro RNC. If the HNB frequency is above a certain threshold, the macro RNC enables IFHO.

With respect to identifying femto cells, the exemplary procedure illustrated in FIG. 5 includes the following steps, which are described element-by-element.

First, the steps performed by a Home Node B Management System (HMS) are described, wherein the HMS administers the HNB network. In an aspect, when a HNB is powered on, initialization messages are exchanged between the HMS and the HNB. Within such embodiment, it should be appreciated that the set of primary scrambling codes that may be assigned to the HNBs are denoted as:

$$HS:=\{hsc1, hsc2, \ldots, hscK1\},$$

where K1 denotes the number of primary scrambling codes allocated to the HNBs.

It should be further appreciated that the set of primary scrambling codes that may be assigned to the beacons are denoted as:

$$BS:=\{bsc1, bsc2, \ldots, bscK2\},$$

where K2 denotes the number of available primary scrambling codes for the beacons.

For this embodiment, HNBs select suitable primary scrambling codes from the set HS and BS and report these primary scrambling codes to the HMS. After receiving the report from the HNB, the HMS looks for a suitable offset value (Δ) to assign to the HNB, wherein the offsets are chosen from the set of integers between 0 and 255. Moreover, the set of offsets is defined as:

$$\Delta:=[0, 1, \ldots, 255],$$

Next, primary scrambling codes and offset values are assigned to the HNBs. In a particular embodiment, a Cartesian product of HS, BS and Δ is taken, resulting in the set of HNB identifiers defined as:

$$HNBID:=HS \times BS \times \Delta:=\{(0, hsc_1, bsc_1), (0, hsc_2, bsc_2), \ldots (255, hsc_{K1}, bsc_{K2})\}.$$

The HMS then selects an unused pair from the HNBID set and assigns it to the HNB. Here, it should be noted that the length of the HNBID set depends on the length of the HS set and BS set.

Next, the steps performed by an HNB are described. In an aspect, the HNB receives a unique identifier from the HMS. Upon receiving the unique identifier, the HNB performs an initialization procedure, wherein the HNB sets its SFN on the HNB operating frequency and beacon such that:

$$\Delta = SFN_{MNB} - SFN_{F1} \text{ and } SFN_{beacon} = SFN_{F1}$$

In an aspect, this SFN initialization procedure is carried out by all HNBs, wherein every HNB is assigned a SFN.

Next, the steps performed by the UE are described, wherein these steps may be followed by legacy UEs. In an active call, a UE is connected to the macro RNC and is in Cell_DCH state. The UE receives a request from the macro RNC to measure (intra-frequency) Beacon PSCs provided in the NCL. After performing synchronization, the UE obtains the frame number (i.e., SFN) from the broadcast control channel (BCCH). In the UE's initial report, which is sent to the macro RNC, various attributes are reported including, a SFN-CFN time difference (Cell_DCH), beacon scrambling code, and other measurement parameters of the beacon transmission by the HNB. After sending the MRM to the macro RNC, the UE is configured to detect Event 2c. UE then performs compressed mode measurements, wherein the UE's subsequent MRM includes the HNB scrambling code, and other measurements on the HNB operating frequency.

Next, the steps performed by the macro RNC are described. In an aspect, upon obtaining the UE's MRMs (e.g., Event 1a and Event 2c), the Macro RNC retrieves the corresponding offset and scrambling code information and initiates an inter-RNC hard handoff procedure. Furthermore, the macro RNC passes the MRMs to the Home Node-B Gateway, as illustrated in FIG. 5. Similar to the inter-RNC hard handoff procedure, the HNB GW can then extract the HNBID based on the two reports. If a match is found, then the hard hand off procedure is completed.

Figure 6:
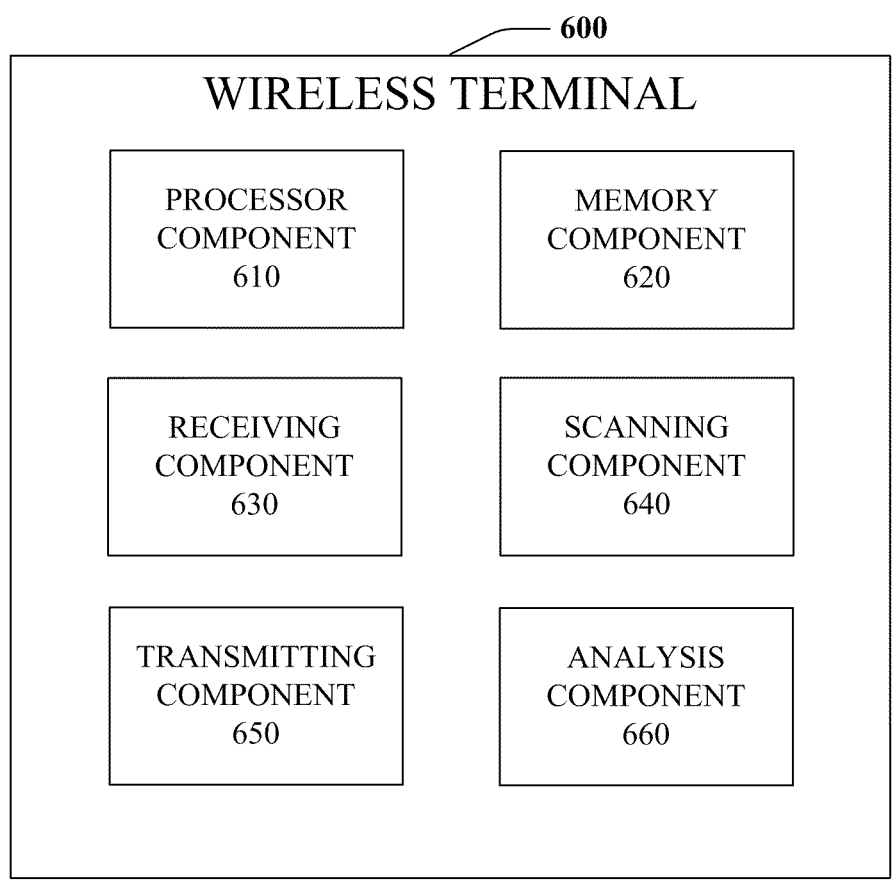
FIG. 6 illustrates a block diagram of an exemplary wireless terminal that facilitates a beacon-assisted handover in accordance with an aspect of the subject specification.

Referring next to FIG. 6, a block diagram of an exemplary wireless terminal that facilitates a beacon-assisted handover according to an embodiment is provided. As shown, wireless terminal 600 may include processor component 610, memory component 620, receiving component 630, scanning component 640, transmitting component 650, and analysis component 660.

In one aspect, processor component 610 is configured to execute computer-readable instructions related to performing any of a plurality of functions. Processor component 610 can be a single processor or a plurality of processors dedicated to analyzing information to be communicated from wireless terminal 600 and/or generating information that can be utilized by memory component 620, receiving component 630, scanning component 640, transmitting component 650, and/or analysis component 660. Additionally or alternatively, processor component 610 may be configured to control one or more components wireless terminal 600.

In another aspect, memory component 620 is coupled to processor component 610 and configured to store computer-readable instructions executed by processor component 610. Memory component 620 may also be configured to store any of a plurality of other types of data including algorithms for collecting beacon signal data, as well as data generated by any of receiving component 630, scanning component 640, transmitting component 650, and/or analysis component 660. Memory component 620 can be configured in a number of different configurations, including as random access memory, battery-backed memory, hard disk, magnetic tape, etc. Various features can also be implemented upon memory component 620, such as compression and automatic back up (e.g., use of a Redundant Array of Independent Drives configuration).

In yet another aspect, receiving component 630 and transmitting component 650 are also coupled to processor component 610 and configured to interface wireless terminal 600 with external entities. For instance, receiving component 630 may be configured to receive a control message during an active communication facilitated by a macro network (e.g., via a base station, radio network controller, etc.), whereas transmitting component 650 may be configured to transmit a report to the macro network which facilitates determining whether a beacon has been detected.

As illustrated, wireless terminal 600 also includes scanning component 640. Within such embodiment, scanning component 640 is configured to scan a frequency identified in the control message and associated with a beacon transmitted by a femto cell. To this end, it should be noted that a particular femto cell may broadcast a beacon at a first frequency while operating on a second frequency, wherein the first frequency is different than the second frequency. It should be further noted that a control message may direct wireless terminal 600 to scan for a plurality of femto cells in which the femto cells collectively broadcast a plurality of distinct beacons (e.g., where wireless terminal 600 enters an area with several "candidate" handover femto cells). Accordingly, in an aspect, scanning component 640 may be configured to scan any of a plurality of frequencies identified in a control message, wherein the frequencies are scanned either individually or simultaneously.

For some embodiments, wireless terminal 600 further includes analysis component 660, which is configured to ascertain attributes associated with detected signals. In an aspect, such attributes may be detected, measured, and/or processed by analysis component 660 and subsequently included in the report transmitted via transmitting component 650. Here, it should be noted that such attributes may correspond to a femto cell's beacon broadcast (i.e., attributes ascertained from scanning the frequency of the beacon) and/or femto cell operation (i.e., attributes ascertained from scanning the femto cell's operating frequency). For instance, with respect to beacon attributes, analysis component 660 may be configured to ascertain a frame number, scrambling code, and/or any other measurement associated with a beacon. Similarly, with respect to femto cell attributes, analysis component 660 may be configured to ascertain a frame number, scrambling code and/or any other measurement associated with the femto cell's operation.

Figure 7:
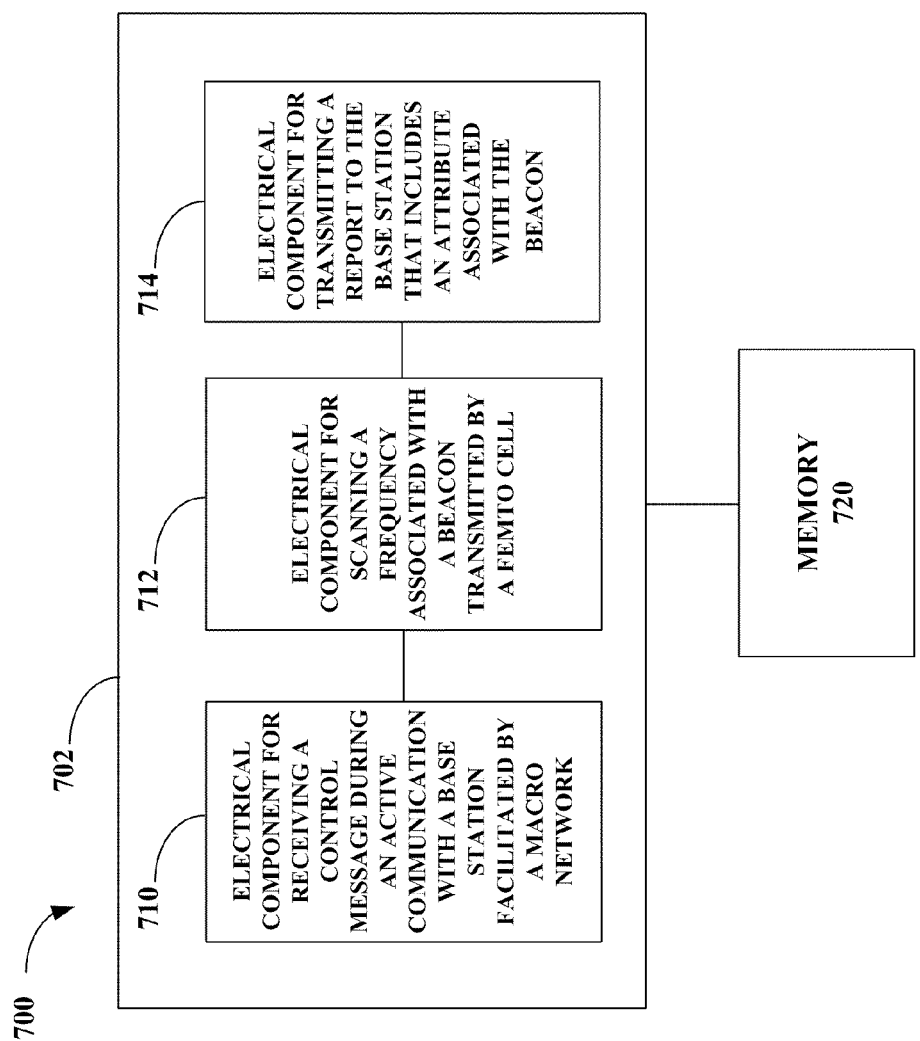
FIG. 7 is an illustration of an exemplary coupling of electrical components that effectuate facilitating a beacon-assisted handover from a wireless terminal.

Turning to FIG. 7, illustrated is a system 700 that facilitates a beacon-assisted handover according to an embodiment. System 700 can reside within a wireless terminal, for instance. As depicted, system 700 includes functional blocks that can represent functions implemented by a processor, software, or combination thereof (e.g., firmware). System 700 includes a logical grouping 702 of electrical components that can act in conjunction. As illustrated, logical grouping 702 can include an electrical component for receiving a control message during an active communication with a base station facilitated by a macro network 710. Furthermore, logical grouping 702 can include an electrical component for scanning a frequency associated with a beacon transmitted by a femto cell 712. Logical grouping 702 can also include an electrical component for transmitting a report to the base station that includes an attribute associated with the beacon 714. Additionally, system 700 can include a memory 720 that retains instructions for executing functions associated with electrical components 710, 712, and 714. While shown as being external to memory 720, it is to be understood that electrical components 710, 712, and 714 can exist within memory 720.

Figure 8:
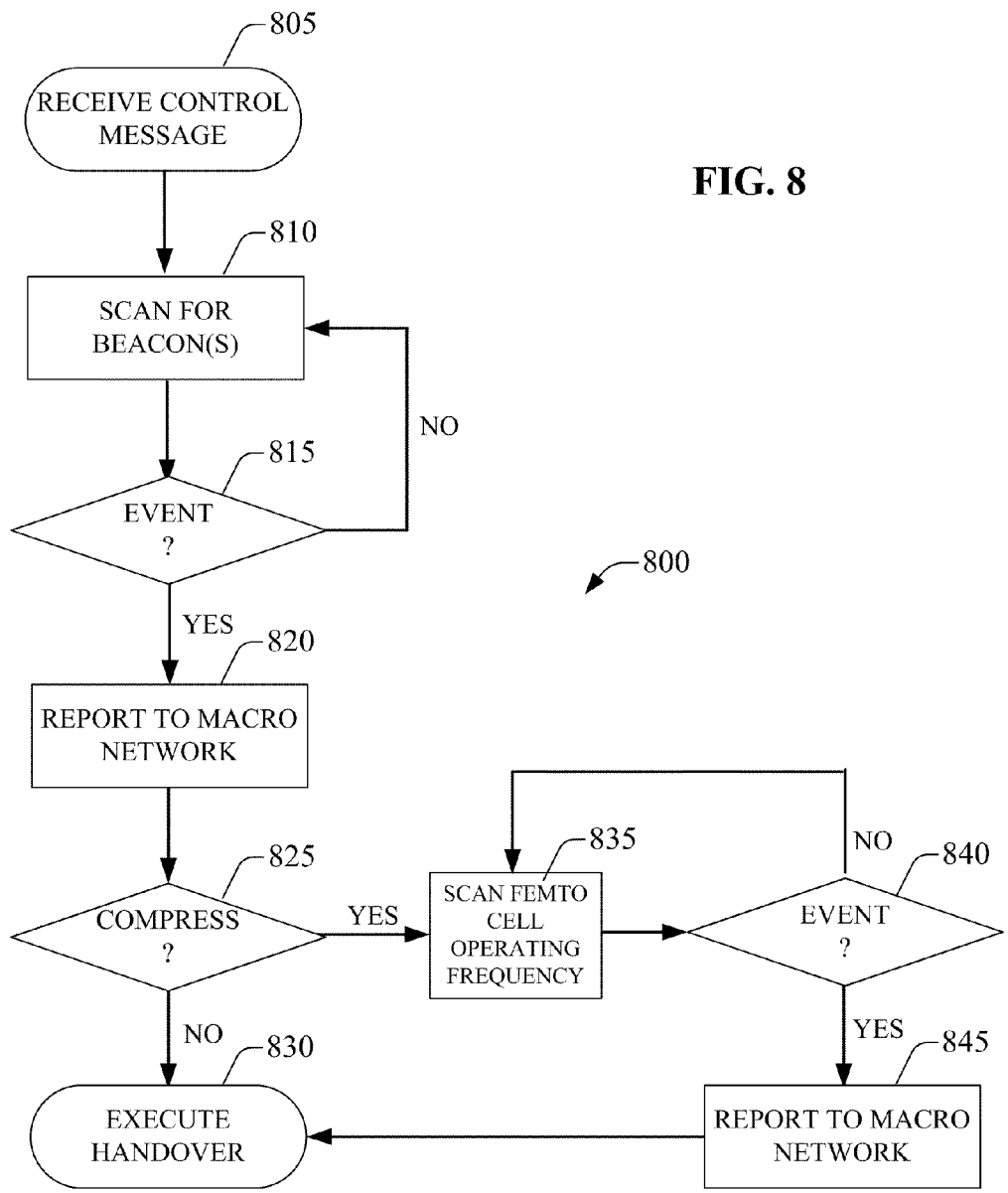
FIG. 8 is a flow chart illustrating an exemplary methodology for facilitating a beacon-assisted handover from a wireless terminal in accordance with an aspect of the subject specification.

Referring next to FIG. 8, a flow chart illustrating an exemplary method for facilitating a beacon-assisted handover from a wireless terminal is provided. As illustrated, process 800 includes a series of acts that may be performed by a wireless terminal according to an aspect of the subject specification. For instance, process 800 may be implemented by employing a processor to execute computer executable instructions stored on a computer readable storage medium to implement the series of acts. In another embodiment, a computer-readable storage medium comprising code for causing at least one computer to implement the acts of process 800 are contemplated.

In an aspect, process 800 begins with the wireless terminal receiving a control message from a macro network at act 805, wherein the control message is received during an active communication facilitated by the macro network. Within such control message, the macro network may direct the wireless terminal to perform any of a plurality of functions. For this embodiment, the control message directs the wireless terminal to scan particular frequencies for the presence of beacon signals. Here, it should be appreciated that, although the control message directs the wireless terminal to scan frequencies corresponding to beacons, it is not necessary for the wireless terminal to know whether it is scanning for beacons. Namely, since beacons are substantially similar to other cells from the perspective of a wireless terminal, the wireless terminal would report them to the macro network like any other cell based on the control message settings. The macro network would then know that it is a femto cell beacon based on, for example the particular PSC included in the report.

At act 810, process 800 thus proceeds with the wireless terminal scanning frequencies corresponding to beacons broadcast by particular femto cells identified by the macro network. At act 815, the wireless terminal then determines whether a signal corresponding to a beacon event has been detected. If a signal corresponding to a beacon event has indeed been detected, the wireless terminal then reports the event to the macro network at act 820. Otherwise, if no beacon events are detected, process 800 loops back to act 810 where the wireless terminal continues to scan for beacons.

For some embodiments, the macro network may direct the wireless terminal to perform compressed mode sensing prior to executing a handover. Accordingly, at act 825, a determination is made as to whether compressed mode sensing will be performed. If no compressed mode sensing is required, process 800 concludes at act 830 where the active communication is handed over to the femto cell that broadcasted the detected beacon.

However, if compressed mode sensing is indeed required at act 825, process 800 proceeds to act 835 where the wireless terminal is directed to scan the operating frequency of a femto cell. At act 840, the wireless terminal then determines whether a particular femto cell event has been detected. If no femto cell events are detected, process 800 loops back to act 835 where the wireless terminal continues to scan the femto cell's operating frequency. Otherwise, if a femto cell event is indeed detected, the wireless terminal reports the event to the macro network at act 845, which facilitates a subsequent handover execution at act 830.

Figure 9:
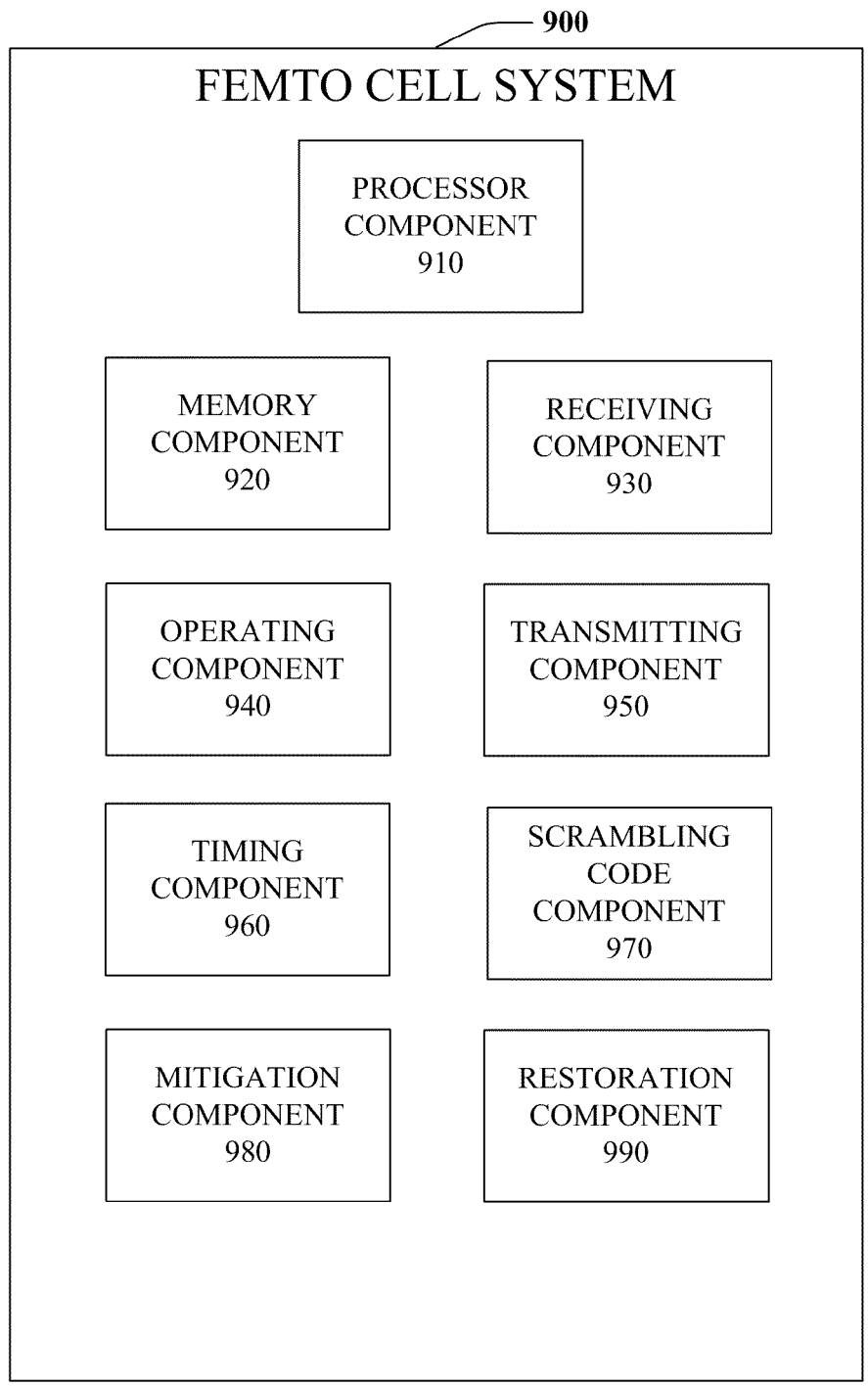
FIG. 9 illustrates a block diagram of an exemplary femto cell system that facilitates a beacon-assisted handover in accordance with an aspect of the subject specification.

Referring next to FIG. 9, a block diagram illustrates an exemplary femto cell system in accordance with various aspects. As illustrated, femto cell system 900 may include processor component 910, memory component 920, receiving component 930, operating component 940, transmitting component 950, timing component 960, scrambling code component 970, mitigation component 980, and restoration component 990.

Similar to processor component 610 in wireless terminal 600, processor component 910 is configured to execute computer-readable instructions related to performing any of a plurality of functions. Processor component 910 can be a single processor or a plurality of processors dedicated to analyzing information to be communicated from femto cell system 900 and/or generating information that can be utilized by memory component 920, receiving component 930, operating component 940, transmitting component 950, timing component 960, scrambling code component 970, mitigation component 980, and/or restoration component 990. Additionally or alternatively, processor component 910 may be configured to control one or more components of femto cell system 900.

In another aspect, memory component 920 is coupled to processor component 910 and configured to store computer-readable instructions executed by processor component 910. Memory component 920 may also be configured to store any of a plurality of other types of data including data generated by any of receiving component 930, operating component 940, transmitting component 950, timing component 960, scrambling code component 970, mitigation component 980, and/or restoration component 990. Here, it should be noted that memory component 920 is analogous to memory component 620 in wireless terminal 600. Accordingly, it should be appreciated that any of the aforementioned features/configurations of memory component 620 are also applicable to memory component 920.

In yet another aspect, receiving component 930 and transmitting component 950 are also coupled to processor component 910 and configured to interface femto cell system 900 with external entities. For instance, receiving component 930 may be configured to receive an initialization message that includes a unique identifier associated with femto cell system 900, whereas transmitting component 950 may be configured to broadcast at least one beacon signal according to the unique identifier (wherein the at least one beacon signal is broadcast at a frequency different than an operating frequency of femto cell system 900).

As illustrated, femto cell system 900 further includes operating component 940. Within such embodiment, operating component 940 is configured to operate femto cell system 900 at a particular operating frequency. In an aspect, operating component 940 is configured to operate femto cell system 900 as a function of the unique identifier included in the initialization message.

For some embodiments, femto cell system 900 also includes timing component 960, which is configured to ascertain a timing offset value from the unique identifier. In an aspect, femto cell system 900 is configured to implement the timing offset as an attribute detectable by nearby wireless terminals. For instance, femto cell system 900 may be configured operate the femto cell and/or broadcast a beacon from the femto cell based on the timing offset. A wireless terminal may then detect and report this timing offset to the macro network, which uses the timing offset to help identify femto cell system 900.

In another aspect, femto cell system 900 includes scrambling code component 970, as illustrated. Within such embodiment, scrambling code component 970 is configured to ascertain a scrambling code from the unique identifier. In a first aspect, a scrambling code ascertained by scrambling code component 970 is associated with the femto cell itself, wherein the femto cell is operated according to the femto cell-specific scrambling code (e.g., by making the scrambling code detectable over the femto cell's operating frequency). However, in a second aspect, the scrambling code ascertained by scrambling code component 970 is associated with a particular beacon, wherein the femto cell broadcasts the beacon according to this beacon-specific scrambling code (e.g., by making the scrambling code detectable over the beacon's frequency).

In yet another aspect, since broadcasting beacons may inadvertently cause interference to wireless terminals, femto cell system 900 may also include mitigation component 980 and restoration component 990. Namely, mitigation component 980 may be configured to detect a wireless terminal, wherein a potential interference with the wireless terminal is mitigated by controlling the potentially interfering beacon signal. For instance, mitigation component 980 may be configured to mitigate the potential interference by discontinuing the beacon signal, decreasing a broadcast power of the beacon signal, and/or varying a periodicity of the beacon signal. Restoration component 990 may then be configured to restore the beacon signal when it is safe to do so.

Figure 10:
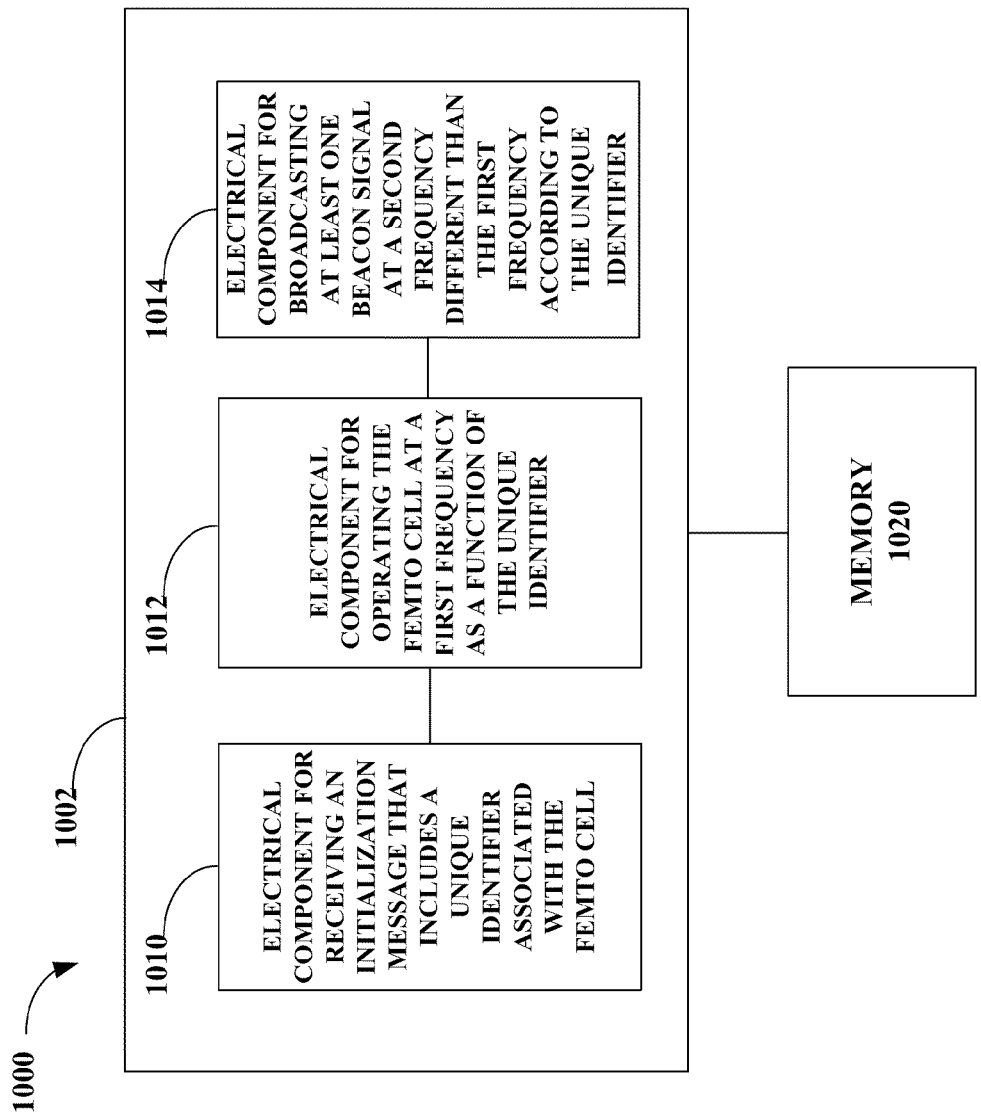
FIG. 10 is an illustration of an exemplary coupling of electrical components that effectuate facilitating a beacon-assisted handover from a femto cell.

Referring next to FIG. 10, illustrated is a system 1000 that facilitates a beacon-assisted handover according to an embodiment. System 1000 and/or instructions for implementing system 1000 can physically reside within a femto cell or computer-readable storage medium, for instance, wherein system 1000 includes functional blocks that can represent functions implemented by a processor, software, or combination thereof (e.g., firmware). Moreover, system 1000 includes a logical grouping 1002 of electrical components that can act in conjunction similar to logical grouping 702 in system 700. As illustrated, logical grouping 1002 can include an electrical component for receiving an initialization message that includes a unique identifier associated with the femto cell 1010. Furthermore, logical grouping 1002 can include an electrical component for operating the femto cell at a first frequency as a function of the unique identifier 1012. Logical grouping 1002 can also include an electrical component for broadcasting at least one beacon signal at a second frequency different than the first frequency according to the unique identifier 1014. Additionally, system 1000 can include a memory 1020 that retains instructions for executing functions associated with electrical components 1010, 1012, and 1014. While shown as being external to memory 1020, it is to be understood that electrical components 1010, 1012, and 1014 can exist within memory 1020.

Figure 11:
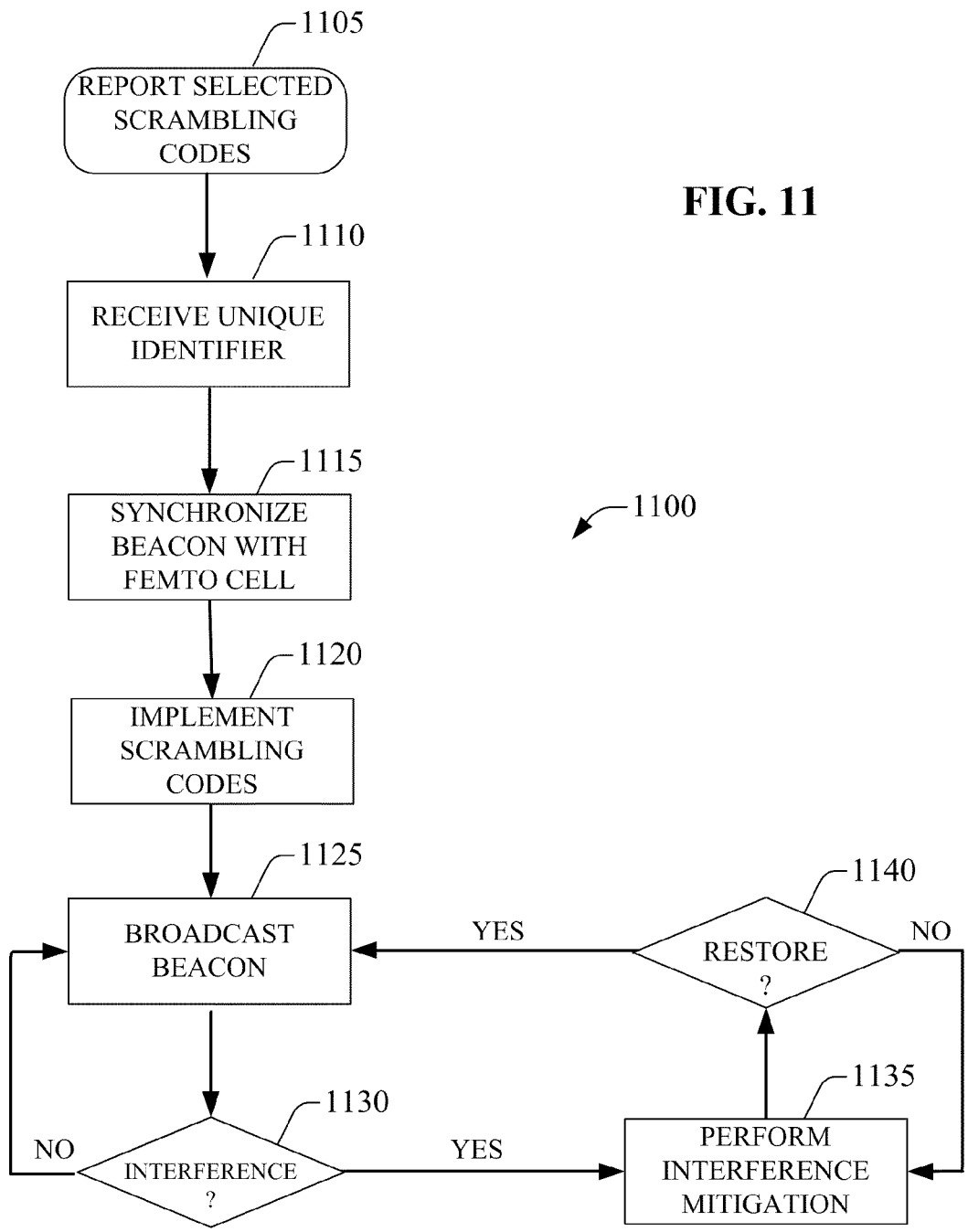
FIG. 11 is a flow chart illustrating an exemplary methodology for facilitating a beacon-assisted handover from a femto cell in accordance with an aspect of the subject specification.

Referring next to FIG. 11, a flow chart illustrating an exemplary method for facilitating a beacon-assisted handover from a femto cell is provided. As illustrated, process 1100 includes a series of acts that may be performed by a femto cell system according to an aspect of the subject specification. For instance, process 1100 may be implemented by employing a processor to execute computer executable instructions stored on a computer readable storage medium to implement the series of acts. In another embodiment, a computer-readable storage medium comprising code for causing at least one computer to implement the acts of process 1100 are contemplated.

In an aspect, process 1100 begins with a reporting to a femto cell management system at act 1105 of particular scrambling codes selected by the femto cell. For this particular embodiment, the femto cell selects suitable femto cell scrambling codes from a set of available femto cell scrambling codes, as well as suitable beacon scrambling codes from a set of available beacon scrambling codes.

At act 1110, the femto cell then receives a unique identifier from the femto cell management system. In an aspect, the femto cell may ascertain initialization parameters from the unique identifier, including a particular timing offset assigned to the femto cell and/or particular scrambling codes assigned to the femto cell. For instance, at act 1115, the femto cell may synchronize the beacon frequency and the operating frequency according to the timing offset. At act 1120, the femto cell may then initialize the beacon and femto cell parameters by respectively implementing the assigned scrambling codes (e.g., initializing the beacon broadcast to implement the assigned beacon scramble code, and initializing operation of the femto cell to implement the assigned femto cell scramble code). Process 1100 may then proceed with the femto cell broadcasting a beacon at step 1125.

Here, since aspects described herein call for the broadcast of beacons in the macro frequency (or generally, in frequencies where the femto cell does not operate), it should be noted that broadcasting a beacon from a femto cell may cause interference in a wireless terminal Namely, the presence of such a beacon, especially in cell-edge situations, can create an outage where the beacon interferes with the wireless terminal and where access to the femto cell is denied.

To mitigate the adverse affects of interference, at act 1130, process 1100 first ascertains the presence of a nearby wireless terminal. Here, it should be appreciated that multiple techniques may be used to detect the presence of a nearby wireless terminal. If no wireless terminal is detected, process 1100 loops back to act 1125 where the beacon signal continues to be broadcast. Otherwise, if a wireless terminal is indeed detected, mitigation techniques are performed at act 1135 to avoid a potential interference with the detected wireless terminal.

It should be noted that any of a plurality of mitigation techniques may be implemented. In a first exemplary mitigation technique, the handover to the femto cell is processed, even if the wireless terminal is not explicitly allowed access to the femto cell. Within such embodiment, the femto cell may or may not adopt any further interference-mitigation techniques.

In a second exemplary aspect, upon detecting a hand-in attempt for a non-allowed wireless terminal, the femto cell mitigates interference from itself on the operating frequency of the wireless terminal. For instance, the femto cell may stop broadcasting the beacon via the wireless terminal's operating frequency. The femto cell may also decrease the broadcast power of the beacon if it is deemed sufficient for interference management purposes. Furthermore, the femto cell may transmit the beacon at (rarer) periodic or a-periodic intervals with constant or varying power.

It should be appreciated that mitigation techniques may vary between different femto cells and/or between different handover attempts. If the aforementioned first exemplary mitigation technique (i.e., where the handover to the femto cell is processed, even if the wireless terminal is not explicitly allowed access to the femto cell, the femto cell may take the additional step of handing out the non-allowed wireless terminal as soon as possible. The hand-out decision may be performed after mitigating interference from the beacon, for instance, if the wireless terminal is handed out to a node operating on the frequency where the beacon is broadcast.

For some embodiments, however, it may be desirable to simply not perform any action to mitigate interference to non-allowed wireless terminals. This decision can be reached, for instance, if it is determined that the femto cell beacon on its own does not cause an outage that the wireless terminal might not have experienced otherwise (e.g., because of very good macro coverage, or inexistent macro coverage).

In another aspect, techniques for restoring a beacon on the macro frequency are contemplated, wherein the broadcast of the beacon may have been altered/stopped to mitigate interference. For instance, in a first exemplary technique, the (peak and/or average) beacon power could be slowly ramped up. If the slow ramp-up is found to interfere with a non-allowed wireless terminal, such ramp can be stopped and/or reversed.

In a second exemplary restoration technique, the beacon is restored instantaneously or gradually, for instance, after the wireless terminal exits the beacon coverage. For example, this may occur where the wireless terminal is handed out to a cell whose coverage does not overlap with the beacon coverage. This method could benefit from signaling to the femto cell from the macro network and/or femto cell gateway to notify the femto cell of the occurrence of such an event.

In a third exemplary restoration technique, the beacon is restored if multiple femto cells had been prepared for and/or notified of the potential hand-in of the wireless terminal, wherein the actual target femto cell is identified only at some later point (e.g., via hand-off, uplink sensing, or some other kind of over-the-air or over-the-backhaul notification). After the actual target femto cell is identified, the non-target (but previous potential target) femto cells can be notified, which allows them to restore their beacons accordingly.

Referring back to FIG. 11, process 1100 thus concludes by restoring a beacon according to a restoration technique (e.g., via any of the aforementioned restoration techniques). Specifically, a determination of whether to restore the beacon signal is made at act 1140. If a restoration is not desired and/or appropriate, process 1100 loops back to act 1135 where the interference mitigation techniques continue to be implemented. Otherwise, if a restoration is indeed desired and/or appropriate, process 1100 loops back to act 1125 where a restored version of the beacon is broadcast.

Figure 12:
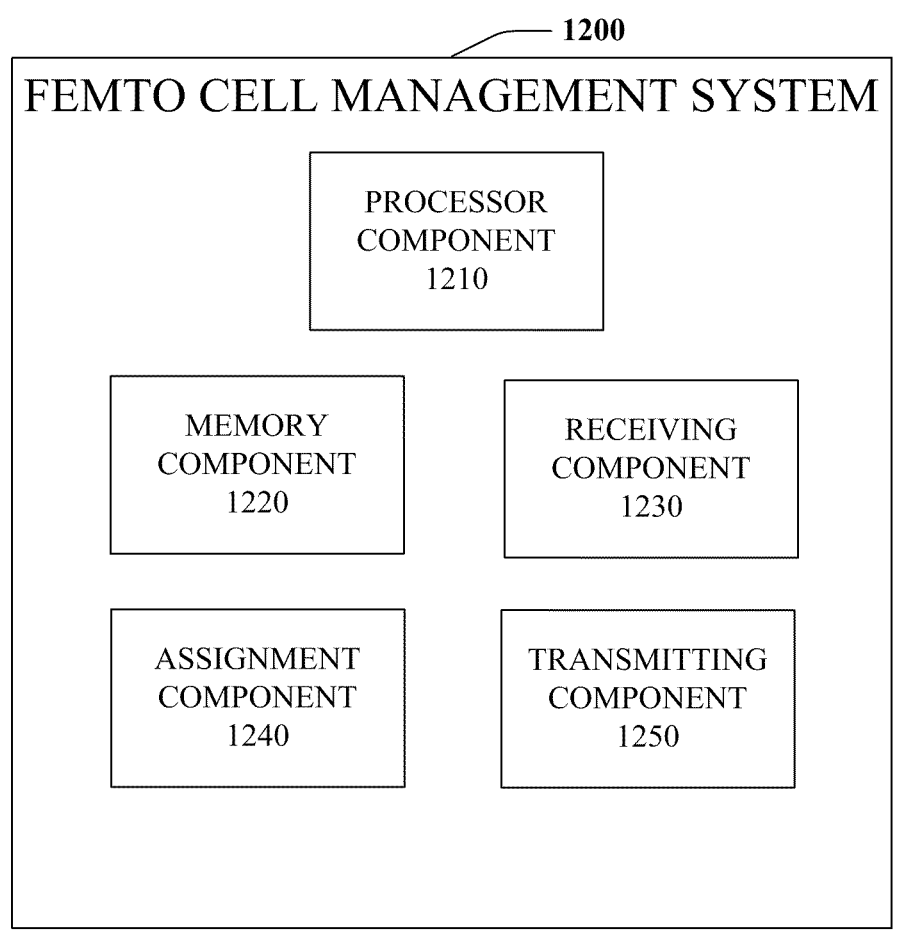
FIG. 12 illustrates a block diagram of an exemplary femto cell management system for managing a beacon-assisted handover in accordance with an aspect of the subject specification.

Referring next to FIG. 12, a block diagram illustrates an exemplary femto cell management system in accordance with various aspects, wherein the femto cell management system may reside in either of management device 422 and/or femto cell gateway 440 illustrated in FIG. 4. As illustrated, femto cell management system 1200 may include processor component 1210, memory component 1220, receiving component 1230, assignment component 1240, and transmitting component 1250.

Similar to processor components 610 and 910 in wireless terminal 600 and femto cell system 900, respectively, processor component 1210 is configured to execute computer-readable instructions related to performing any of a plurality of functions. Processor component 1210 can be a single processor or a plurality of processors dedicated to analyzing information to be communicated from femto cell management system 1200 and/or generating information that can be utilized by memory component 1220, receiving component 1230, assignment component 1240, and/or transmitting component 1250. Additionally or alternatively, processor component 1210 may be configured to control one or more components of femto cell management system 1200.

In another aspect, memory component 1220 is coupled to processor component 1210 and configured to store computer-readable instructions executed by processor component 1210. Memory component 1220 may also be configured to store any of a plurality of other types of data including data generated by any of receiving component 1230, assignment component 1240, and/or transmitting component 1250. Here, it should be noted that memory component 1220 is analogous to memory components 620 and 920 in wireless terminal 600 and femto cell system 900, respectively. Accordingly, it should be appreciated that any of the aforementioned features/configurations of memory component 620 and/or 920 are also applicable to memory component 1220.

In yet another aspect, receiving component 1230 and transmitting component 1250 are also coupled to processor component 1210 and configured to interface femto cell management system 1200 with external entities. For instance, receiving component 1230 may be configured to receive a communication from a femto cell (wherein the communication can identify a scrambling code selected by the femto cell), whereas transmitting component 1250 may be configured to transmit a unique identifier to the femto cell.

As illustrated, femto cell management system 1200 may further include assignment component 1240. Within such embodiment, assignment component 1240 is configured to assign a unique identifier to the femto cell as a function of the communication (e.g., based on a scrambling code selected by the femto cell), wherein the unique identifier identifies an initialization parameter associated with broadcasting a beacon signal from the femto cell. In an aspect, it should be noted that assignment component 1240 may be configured to assign a unique identifier associated with the femto cell and/or beacon. For instance, in a first aspect, assignment component 1240 is configured to ascertain a scrambling code associated with the beacon signal and/or a timing offset associated with the beacon signal, wherein the unique identifier identifies at least one of the beacon—specific scrambling code or the beacon—specific timing offset. In another aspect, however, assignment component 1240 is configured to ascertain a scrambling code associated with an operating frequency of the femto cell and/or a timing offset associated with the operating frequency of the femto cell, wherein the unique identifier identifies at least one of the femto cell—specific scrambling code or the femto cell—specific timing offset.

Figure 13:
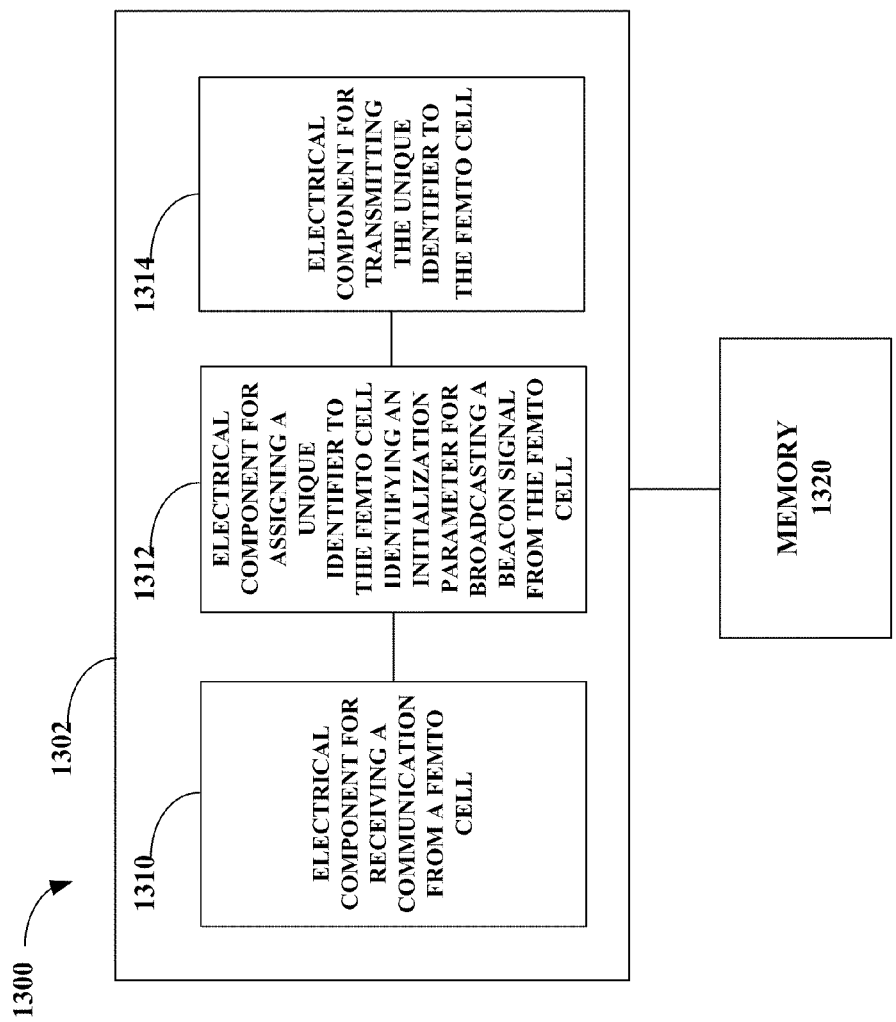
FIG. 13 is an illustration of an exemplary coupling of electrical components that effectuate managing a beacon-assisted handover.

Referring next to FIG. 13, illustrated is a system 1300 that manages a beacon-assisted handover according to an embodiment. System 1300 and/or instructions for implementing system 1300 can physically reside within a femto cell management system (e.g., within either of management device 422 and/or femto cell gateway 440 illustrated in FIG. 4) or computer-readable storage medium, for instance, wherein system 1300 includes functional blocks that can represent functions implemented by a processor, software, or combination thereof (e.g., firmware). Moreover, system 1300 includes a logical grouping 1302 of electrical components that can act in conjunction similar to logical groupings 702 and 1002 in systems 700 and 1000, respectively. As illustrated, logical grouping 1302 can include an electrical component for receiving a communication from a femto cell 1310. Furthermore, logical grouping 1302 can include an electrical component for assigning a unique identifier to the femto cell identifying an initialization parameter for broadcasting a beacon signal from the femto cell 1312. Logical grouping 1302 can also include an electrical component for transmitting the unique identifier to the femto cell 1314. Additionally, system 1300 can include a memory 1320 that retains instructions for executing functions associated with electrical components 1310, 1312, and 1314. While shown as being external to memory 1320, it is to be understood that electrical components 1310, 1312, and 1314 can exist within memory 1320.

Figure 14:
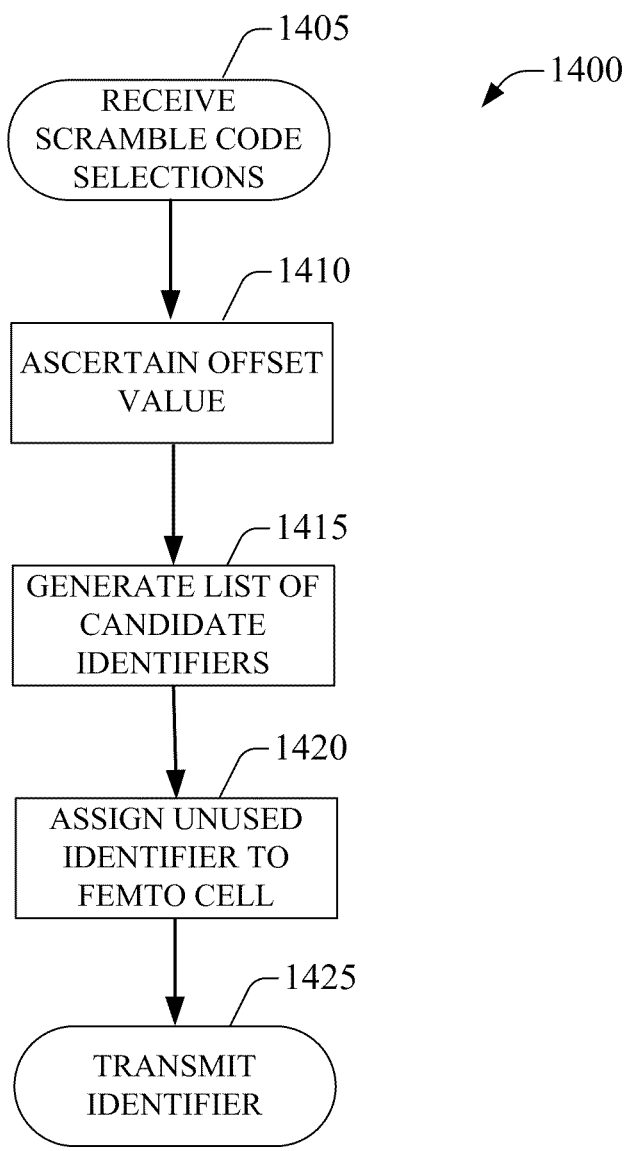
FIG. 14 is a flow chart illustrating an exemplary methodology for managing a beacon-assisted handover in accordance with an aspect of the subject specification.

Referring next to FIG. 14, a flow chart illustrating an exemplary method for managing a beacon-assisted handover is provided. As illustrated, process 1400 includes a series of acts that may be performed by a femto cell management (e.g., within either of management device 422 and/or femto cell gateway 440 illustrated in FIG. 4) system according to an aspect of the subject specification. For instance, process 1400 may be implemented by employing a processor to execute computer executable instructions stored on a computer readable storage medium to implement the series of acts. In another embodiment, a computer-readable storage medium comprising code for causing at least one computer to implement the acts of process 1400 are contemplated.

In an aspect, process 1400 begins at act 1405 where the femto cell management system receives a report identifying a set of scrambling codes selected by a femto cell. For this particular embodiment, the report identifies both femto cell scrambling codes and beacon scrambling codes. Upon receiving these scrambling codes, the femto cell management system then ascertains a suitable offset value for the femto cell at act 1410.

Next, process 1400 continues at act 1415 where a list of candidate identifiers is generated. As stated previously, the subject specification discloses a novel technique for identifying femto cells by assigning unique identification attributes. In an aspect, these attributes are tuples taken from the cross product of a set of spreading sequences assigned to the femto cells, beacons, and a set of SFN offsets. For this particular embodiment, the list of candidate identifiers generated at act 1415 may thus include a list of tuples based on the offset value ascertained at act 1410 and the scrambling codes selected by the femto cell.

At step 1420, the femto cell management system then assigns an unused identifier to the femto cell. In an embodiment, the femto cell management system assigns a tuple to the femto cell, which readily identifies the femto cell, wherein the tuple is a unique combination of a beacon scrambling code, a femto cell scrambling code, and an offset value. In another embodiment, however, it should be appreciated that the identifier may include a unique combination of only two of a beacon scrambling code, a femto cell scrambling code, and an offset value (e.g., a beacon PSC and a femto cell PSC; a beacon PSC and an offset value; or a femto cell PSC and an offset value). Process 1400 then concludes at step 1425 where the unique identifier is transmitted to the femto cell and macro network.

Figure 15:
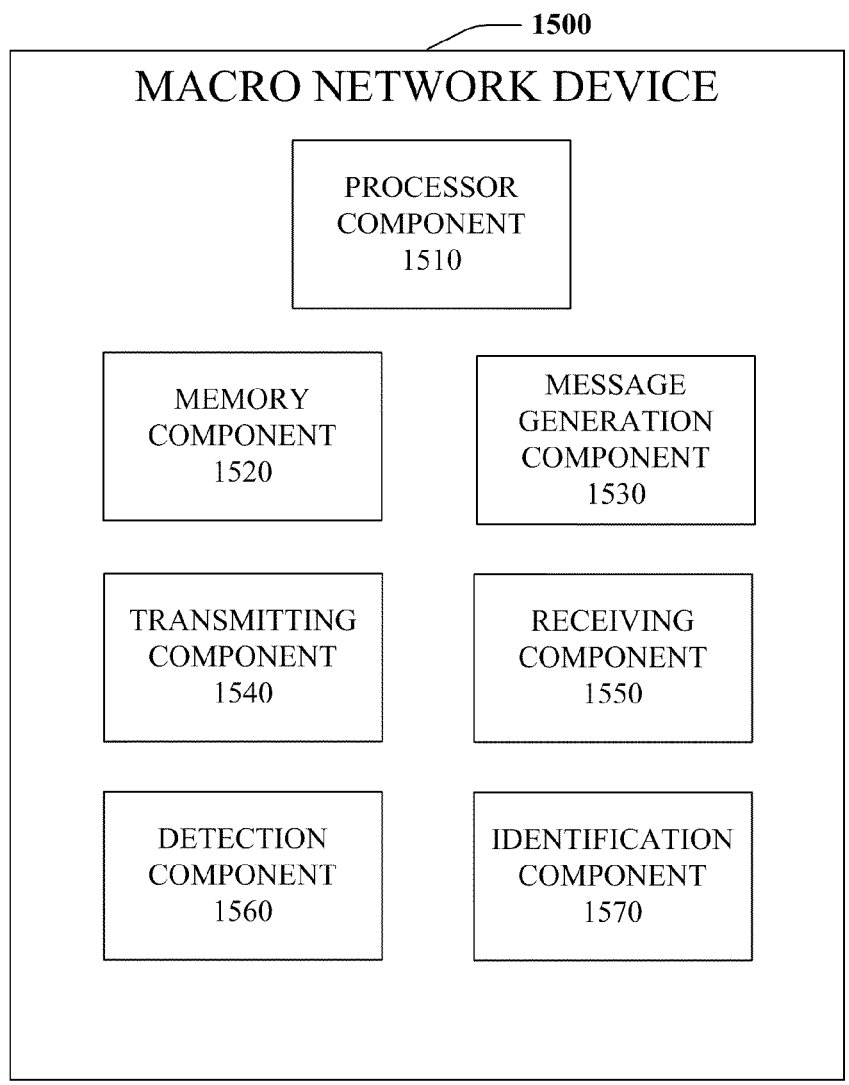
FIG. 15 illustrates a block diagram of an exemplary macro network device that facilitates a beacon-assisted handover in accordance with an aspect of the subject specification.

Referring next to FIG. 15, a block diagram illustrates an exemplary macro network device in accordance with various aspects. As illustrated, macro network device 1500 may include processor component 1510, memory component 1520, message generation component 1530, transmitting component 1540, receiving component 1550, detection component 1560, and identification component 1570.

Similar to processor components 610, 910, and 1210 in wireless terminal 600, femto cell system 900, and femto cell management system 1200, respectively, processor component 1510 is configured to execute computer-readable instructions related to performing any of a plurality of functions. Processor component 1510 can be a single processor or a plurality of processors dedicated to analyzing information to be communicated from macro network device 1500 and/or generating information that can be utilized by memory component 1520, message generation component 1530, transmitting component 1540, receiving component 1550, detection component 1560, and/or identification component 1570. Additionally or alternatively, processor component 1510 may be configured to control one or more components of macro network device 1500.

In another aspect, memory component 1520 is coupled to processor component 1510 and configured to store computer-readable instructions executed by processor component 1510. Memory component 1520 may also be configured to store any of a plurality of other types of data including data generated by any of message generation component 1530, transmitting component 1540, receiving component 1550, detection component 1560, and/or identification component 1570. Here, it should be noted that memory component 1520 is analogous to memory components 620, 920, and 1220 in wireless terminal 600, femto cell system 900, and femto cell management system 1200, respectively. Accordingly, it should be appreciated that any of the aforementioned features/configurations of memory component 620, 920, and/or 1220 are also applicable to memory component 1520.

As illustrated, macro network device 1500 may further include message generation component 1530. Within such embodiment, message generation component 1530 is configured to generate a control message, which directs a wireless terminal to scan a frequency associated with a beacon transmitted by a femto cell. In another embodiment, message generation component 1530 is further configured to generate a subsequent message directing the wireless terminal to scan an operating frequency of the femto cell (wherein the frequency associated with the beacon is different than the operating frequency).

In yet another aspect, transmitting component 1540 and receiving component 1550 are also coupled to processor component 1510 and configured to interface macro network device 1500 with external entities. For instance, transmitting component 1540 may be configured to transmit the control message to the wireless terminal, whereas receiving component 1550 may be configured to receive a report from the wireless terminal that includes a beacon attribute (e.g., a frame number, scrambling code, and/or any other measurement associated with a beacon) and/or a femto cell attribute (e.g., a frame number, scrambling code and/or any other measurement associated with the femto cell's operation).

Macro network device 1500 may also include detection component 1560 and identification component 1570. Within such embodiment, detection component 1560 is configured to ascertain a detection of the femto cell based on a beacon attribute and/or a femto cell attribute. Similarly, identification component 1570 is configured to ascertain an identification of the femto cell based on a beacon attribute and/or a femto cell attribute, in which a handover to the femto cell is facilitated by the identification.

Figure 16:
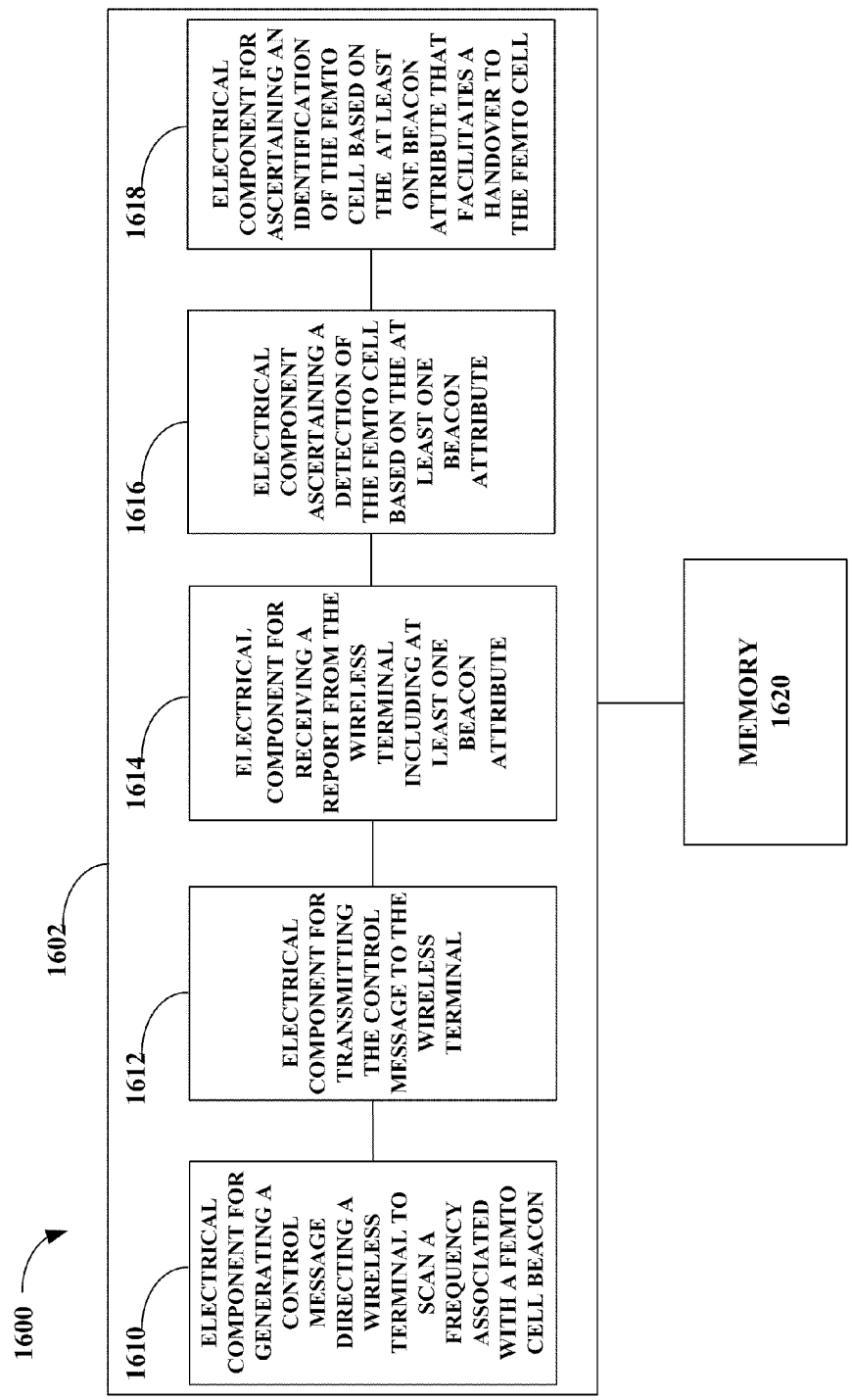
FIG. 16 is an illustration of an exemplary coupling of electrical components that effectuate facilitating a beacon-assisted handover from a macro network device.

Referring next to FIG. 16, illustrated is a system 1600 that facilitates a beacon-assisted handover according to an embodiment. System 1600 and/or instructions for implementing system 1600 can physically reside within a macro network device (e.g., a base station, a radio network controller, etc.) or computer-readable storage medium, for instance, wherein system 1600 includes functional blocks that can represent functions implemented by a processor, software, or combination thereof (e.g., firmware). Moreover, system 1600 includes a logical grouping 1602 of electrical components that can act in conjunction similar to logical groupings 702, 1002, and 1302 in systems 700, 1000, and 1300, respectively. As illustrated, logical grouping 1602 can include an electrical component for generating a control message directing a wireless terminal to scan a frequency associated with a femto cell beacon 1610. Further, logical grouping 1602 can include an electrical component for transmitting the control message to the wireless terminal 1612, and another electrical component for receiving a report from the wireless terminal including at least one beacon attribute 1614. Logical grouping 1602 can also include an electrical component for ascertaining a detection of the femto cell based on the at least one beacon attribute 1616, as well as an electrical component for ascertaining an identification of the femto cell based on the at least one beacon attribute that facilitates a handover to the femto cell 1618. Additionally, system 1600 can include a memory 1620 that retains instructions for executing functions associated with electrical components 1610, 1612, 1614, 1616, and 1618. While shown as being external to memory 1620, it is to be understood that electrical components 1610, 1612, 1614, 1616, and 1618 can exist within memory 1620.

Figure 17:
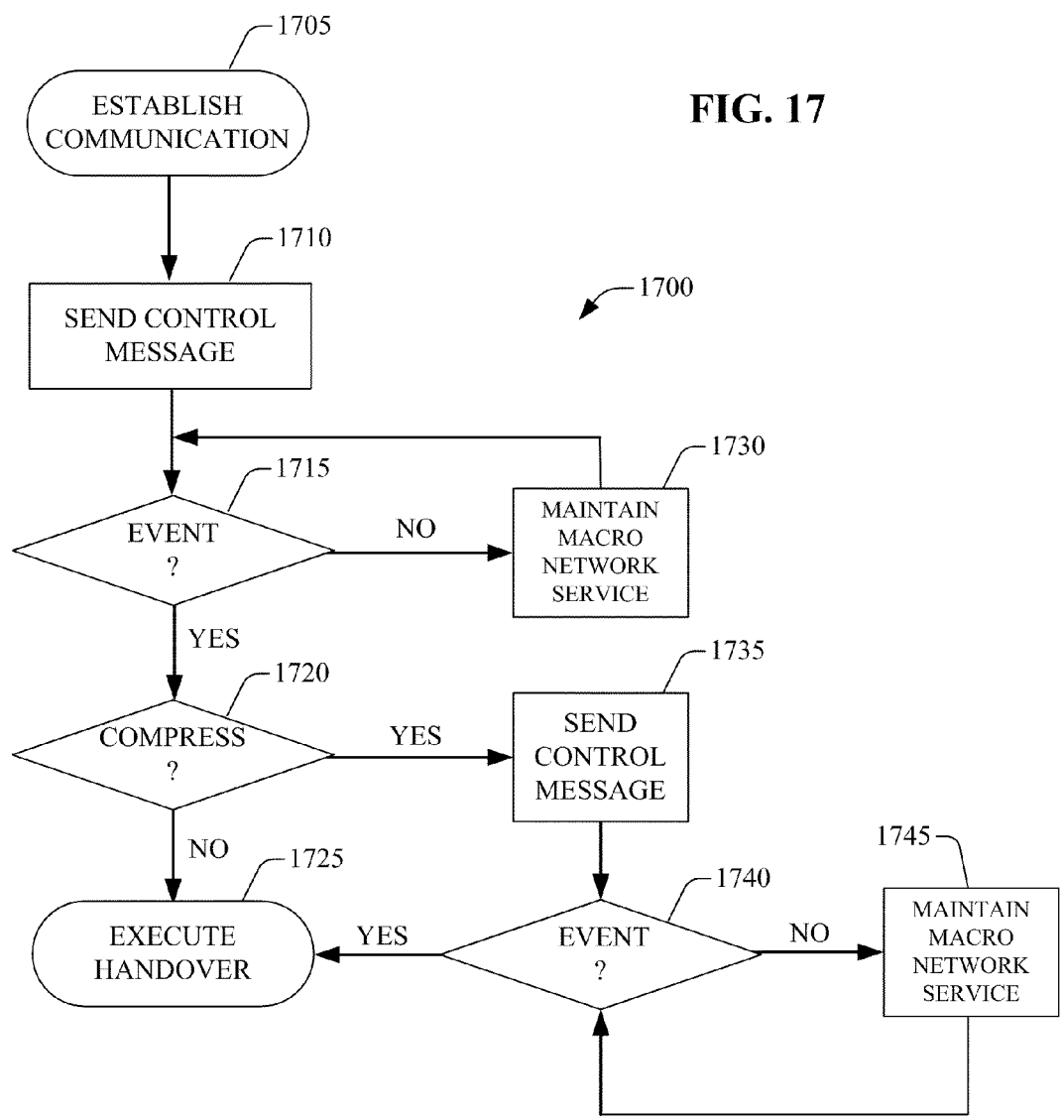
FIG. 17 is a flow chart illustrating an exemplary methodology for facilitating a beacon-assisted handover from a macro network device in accordance with an aspect of the subject specification.

Referring next to FIG. 17, a flow chart illustrating an exemplary method for facilitating a beacon-assisted handover from a macro network is provided. As illustrated, process 1700 includes a series of acts that may be performed by a macro network device according to an aspect of the subject specification. For instance, process 1700 may be implemented by employing a processor to execute computer executable instructions stored on a computer readable storage medium to implement the series of acts. In another embodiment, a computer-readable storage medium comprising code for causing at least one computer to implement the acts of process 1700 are contemplated.

In an aspect, process 1700 begins at act 1705 where the macro network establishes an active communication with a wireless terminal. Next, at act 1710, the macro network sends a control message to the wireless terminal, which includes instructions for performing various functions. For this embodiment, the control message directs the wireless terminal to scan particular frequencies for the presence of beacon signals. At act 1715, the macro network receives reports from the wireless terminal and determines whether a beacon event has been detected. If no beacon events are detected, the macro network continues to provide macro network services at act 1730, wherein process 1700 subsequently loops back to act 1715 where the macro network continues to wait for beacon event notifications.

As stated previously, a macro network may direct the wireless terminal to perform compressed mode sensing prior to executing a handover. Accordingly, if a beacon event has indeed been detected at act 1715, a determination is made at act 1720 as to whether compressed mode sensing will be performed. If no compressed mode sensing is desired, process 1700 concludes at act 1725 where the active communication is handed over to the femto cell that broadcasted the detected beacon.

However, if compressed mode sensing is indeed desired at act 1720, process 1700 proceeds to act 1735 where the macro network sends a subsequent control message directing the wireless terminal to scan for femto cell events over the femto cell's operating frequency. At act 1740, the macro network receives reports from the wireless terminal and determines whether a femto cell event has been detected. If no femto cell events are detected, the macro network continues to provide macro network services at act 1745, wherein process 1700 subsequently loops back to act 1740 where the macro network continues to wait for femto cell event notifications. Otherwise, if a femto cell event is indeed detected, process 1700 concludes at act 1725 where the active communication is handed over to the femto cell that broadcasted the detected beacon.

Exemplary Communication System

Figure 18:
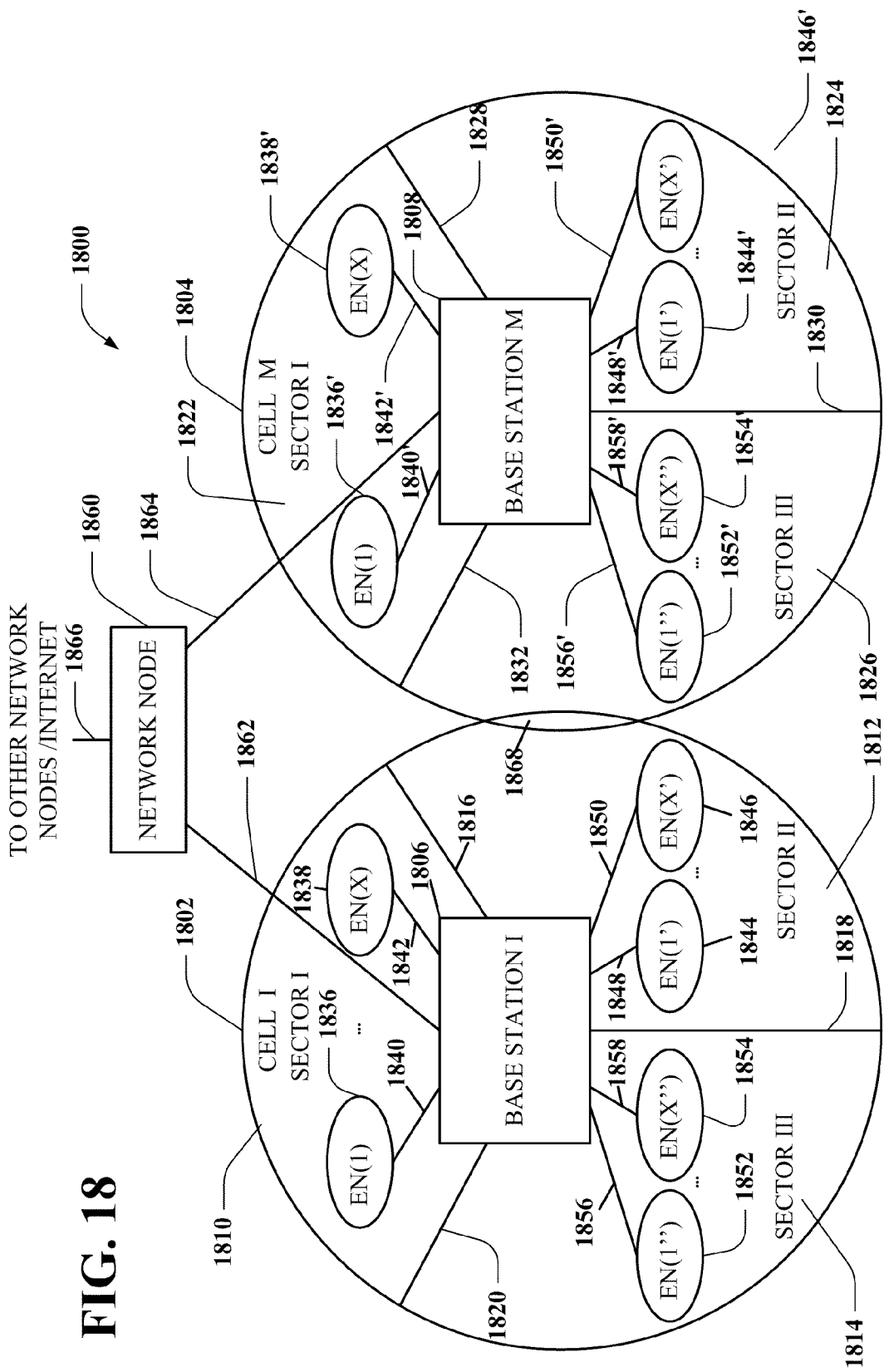
FIG. 18 is an illustration of an exemplary communication system implemented in accordance with various aspects including multiple cells.

Referring next to FIG. 18, an exemplary communication system 1800 implemented in accordance with various aspects is provided including multiple cells: cell I 1802, cell M 1804. Here, it should be noted that neighboring cells 1802, 1804 overlap slightly, as indicated by cell boundary region 1868, thereby creating potential for signal interference between signals transmitted by base stations in neighboring cells. Each cell 1802, 1804 of system 1800 includes three sectors. Cells which have not been subdivided into multiple sectors (N=1), cells with two sectors (N=2) and cells with more than 3 sectors (N>3) are also possible in accordance with various aspects. Cell 1802 includes a first sector, sector 1 1810, a second sector, sector II 1812, and a third sector, sector III 1814. Each sector 1810, 1812, and 1814 has two sector boundary regions; each boundary region is shared between two adjacent sectors.

Sector boundary regions provide potential for signal interference between signals transmitted by base stations in neighboring sectors. Line 1816 represents a sector boundary region between sector 1 1810 and sector II 1812; line 1818 represents a sector boundary region between sector II 1812 and sector III 1814; line 1820 represents a sector boundary region between sector III 1814 and sector 1 1810. Similarly, cell M 1804 includes a first sector, sector 1 1822, a second sector, sector II 1824, and a third sector, sector III 1826. Line 1828 represents a sector boundary region between sector 1 1822 and sector II 1824; line 1830 represents a sector boundary region between sector II 1824 and sector III 1826; line 1832 represents a boundary region between sector III 1826 and sector 1 1822. Cell 1 1802 includes a base station (BS), base station 1 1806, and a plurality of end nodes (ENs) in each sector 1810, 1812, 1814. Sector 1 1810 includes EN(1) 1836 and EN(X) 1838 coupled to BS 1806 via wireless links 1840, 1842, respectively; sector II 1812 includes EN(1') 1844 and EN(X') 1846 coupled to BS 1806 via wireless links 1848, 1850, respectively; sector III 1814 includes EN(1") 1852 and EN(X") 1854 coupled to BS 1806 via wireless links 1856, 1858, respectively. Similarly, cell M 1804 includes base station M 1808, and a plurality of end nodes (ENs) in each sector 1822, 1824, and 1826. Sector 1 1822 includes EN(1) 1836' and EN(X) 1838' coupled to BS M 1808 via wireless links 1840', 1842', respectively; sector II 1824 includes EN(1') 1844' and EN(X') 1846' coupled to BS M 1808 via wireless links 1848', 1850', respectively; sector 3 1826 includes EN(1") 1852' and EN(X") 1854' coupled to BS 1808 via wireless links 1856', 1858', respectively.

System 1800 also includes a network node 1860 which is coupled to BS I 1806 and BS M 1808 via network links 1862, 1864, respectively. Network node 1860 is also coupled to other network nodes, e.g., other base stations, AAA server nodes, intermediate nodes, routers, etc. and the Internet via network link 1866. Network links 1862, 1864, 1866 may be, e.g., fiber optic cables. Each end node, e.g. EN 1 1836 may be a wireless terminal including a transmitter as well as a receiver. The wireless terminals, e.g., EN(1) 1836 may move through system 1800 and may communicate via wireless links with the base station in the cell in which the EN is currently located. The wireless terminals, (WTs), e.g. EN(1) 1836, may communicate with peer nodes, e.g., other WTs in system 1800 or outside system 1800 via a base station, e.g. BS 1806, and/or network node 1860. WTs, e.g., EN(1) 1836 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 19:
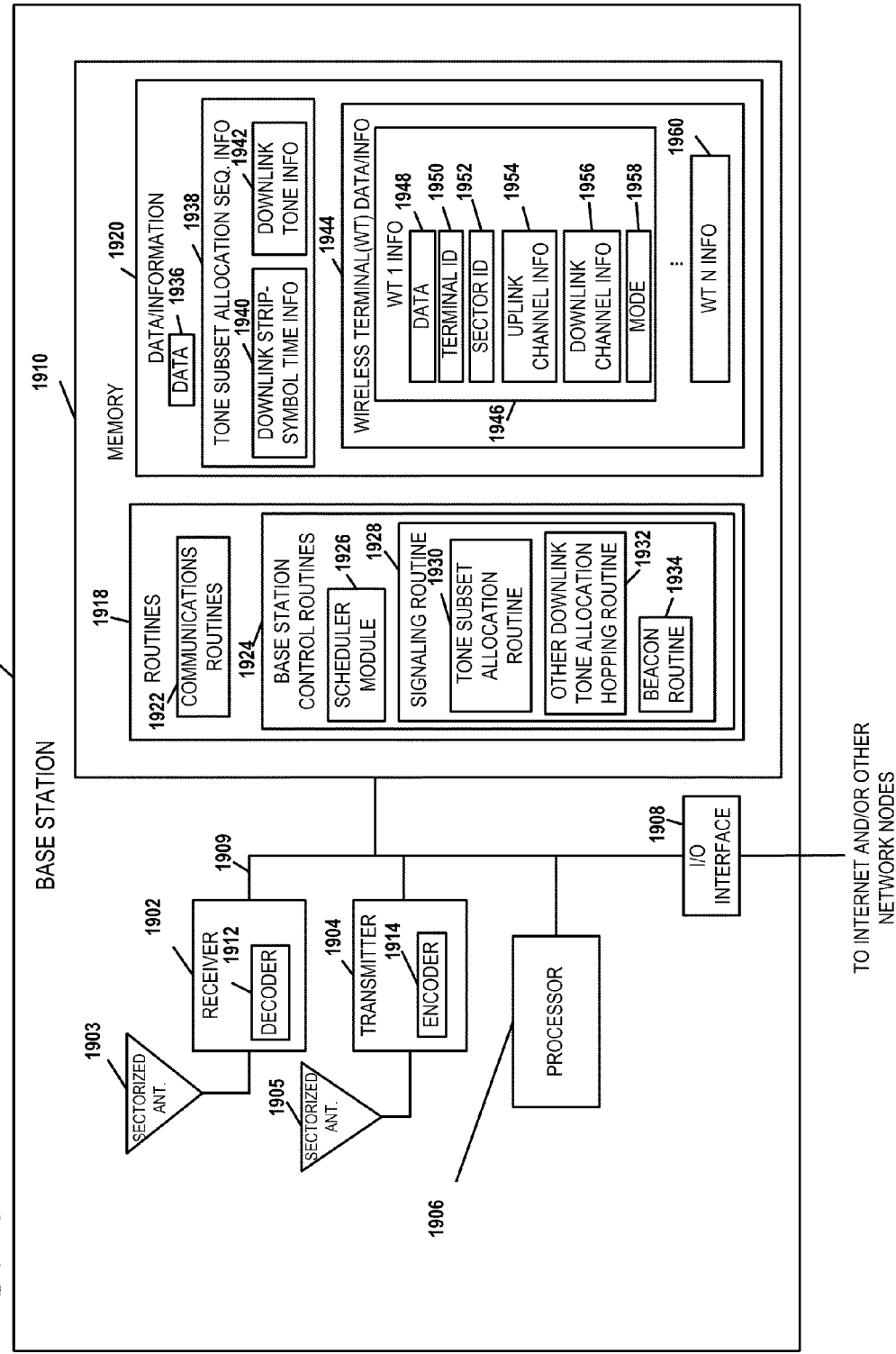
FIG. 19 is an illustration of an exemplary base station in accordance with various aspects described herein.

FIG. 19 illustrates an example base station 1900 in accordance with various aspects. Base station 1900 implements tone subset allocation sequences, with different tone subset allocation sequences generated for respective different sector types of the cell. Base station 1900 may be used as any one of base stations 1806, 1808 of the system 1800 of FIG. 18. The base station 1900 includes a receiver 1902, a transmitter 1904, a processor 1906, e.g., CPU, an input/output interface 1908 and memory 1910 coupled together by a bus 1909 over which various elements 1902, 1904, 1906, 1908, and 1910 may interchange data and information.

Sectorized antenna 1903 coupled to receiver 1902 is used for receiving data and other signals, e.g., channel reports, from wireless terminals transmissions from each sector within the base station's cell. Sectorized antenna 1905 coupled to transmitter 1904 is used for transmitting data and other signals, e.g., control signals, pilot signal, beacon signals, etc. to wireless terminals 2000 (see FIG. 20) within each sector of the base station's cell. In various aspects, base station 1900 may employ multiple receivers 1902 and multiple transmitters 1904, e.g., an individual receivers 1902 for each sector and an individual transmitter 1904 for each sector. Processor 1906, may be, e.g., a general purpose central processing unit (CPU). Processor 1906 controls operation of base station 1900 under direction of one or more routines 1918 stored in memory 1910 and implements the methods. I/O interface 1908 provides a connection to other network nodes, coupling the BS 1900 to other base stations, access routers, AAA server nodes, etc., other networks, and the Internet. Memory 1910 includes routines 1918 and data/information 1920.

Data/information 1920 includes data 1936, tone subset allocation sequence information 1938 including downlink strip-symbol time information 1940 and downlink tone information 1942, and wireless terminal (WT) data/info 1944 including a plurality of sets of WT information: WT 1 info 1946 and WT N info 1960. Each set of WT info, e.g., WT 1 info 1946 includes data 1948, terminal ID 1950, sector ID 1952, uplink channel information 1954, downlink channel information 1956, and mode information 1958.

Routines 1918 include communications routines 1922 and base station control routines 1924. Base station control routines 1924 includes a scheduler module 1926 and signaling routines 1928 including a tone subset allocation routine 1930 for strip-symbol periods, other downlink tone allocation hopping routine 1932 for the rest of symbol periods, e.g., non strip-symbol periods, and a beacon routine 1934.

Data 1936 includes data to be transmitted that will be sent to encoder 1914 of transmitter 1904 for encoding prior to transmission to WTs, and received data from WTs that has been processed through decoder 1912 of receiver 1902 following reception. Downlink strip-symbol time information 1940 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1942 includes information including a carrier frequency assigned to the base station 1900, the number and frequency of tones, and the set of tone subsets to be allocated to the strip-symbol periods, and other cell and sector specific values such as slope, slope index and sector type.

Data 1948 may include data that WT1 2000 has received from a peer node, data that WT 1 2000 desires to be transmitted to a peer node, and downlink channel quality report feedback information. Terminal ID 1950 is a base station 1900 assigned ID that identifies WT 1 2000. Sector ID 1952 includes information identifying the sector in which WT1 2000 is operating. Sector ID 1952 can be used, for example, to determine the sector type. Uplink channel information 1954 includes information identifying channel segments that have been allocated by scheduler 1926 for WT1 2000 to use, e.g., uplink traffic channel segments for data, dedicated uplink control channels for requests, power control, timing control, etc. Each uplink channel assigned to WT1 2000 includes one or more logical tones, each logical tone following an uplink hopping sequence. Downlink channel information 1956 includes information identifying channel segments that have been allocated by scheduler 1926 to carry data and/or information to WT1 2000, e.g., downlink traffic channel segments for user data. Each downlink channel assigned to WT1 2000 includes one or more logical tones, each following a downlink hopping sequence. Mode information 1958 includes information identifying the state of operation of WT1 2000, e.g. sleep, hold, on.

Communications routines 1922 control the base station 1900 to perform various communications operations and implement various communications protocols. Base station control routines 1924 are used to control the base station 1900 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1928 controls the operation of receiver 1902 with its decoder 1912 and transmitter 1904 with its encoder 1914. The signaling routine 1928 is responsible controlling the generation of transmitted data 1936 and control information. Tone subset allocation routine 1930 constructs the tone subset to be used in a strip-symbol period using the method of the aspect and using data/info 1920 including downlink strip-symbol time info 1940 and sector ID 1952. The downlink tone subset allocation sequences will be different for each sector type in a cell and different for adjacent cells. The WTs 2000 receive the signals in the strip-symbol periods in accordance with the downlink tone subset allocation sequences; the base station 1900 uses the same downlink tone subset allocation sequences in order to generate the transmitted signals. Other downlink tone allocation hopping routine 1932 constructs downlink tone hopping sequences, using information including downlink tone information 1942, and downlink channel information 1956, for the symbol periods other than the strip-symbol periods. The downlink data tone hopping sequences are synchronized across the sectors of a cell. Beacon routine 1934 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 20:
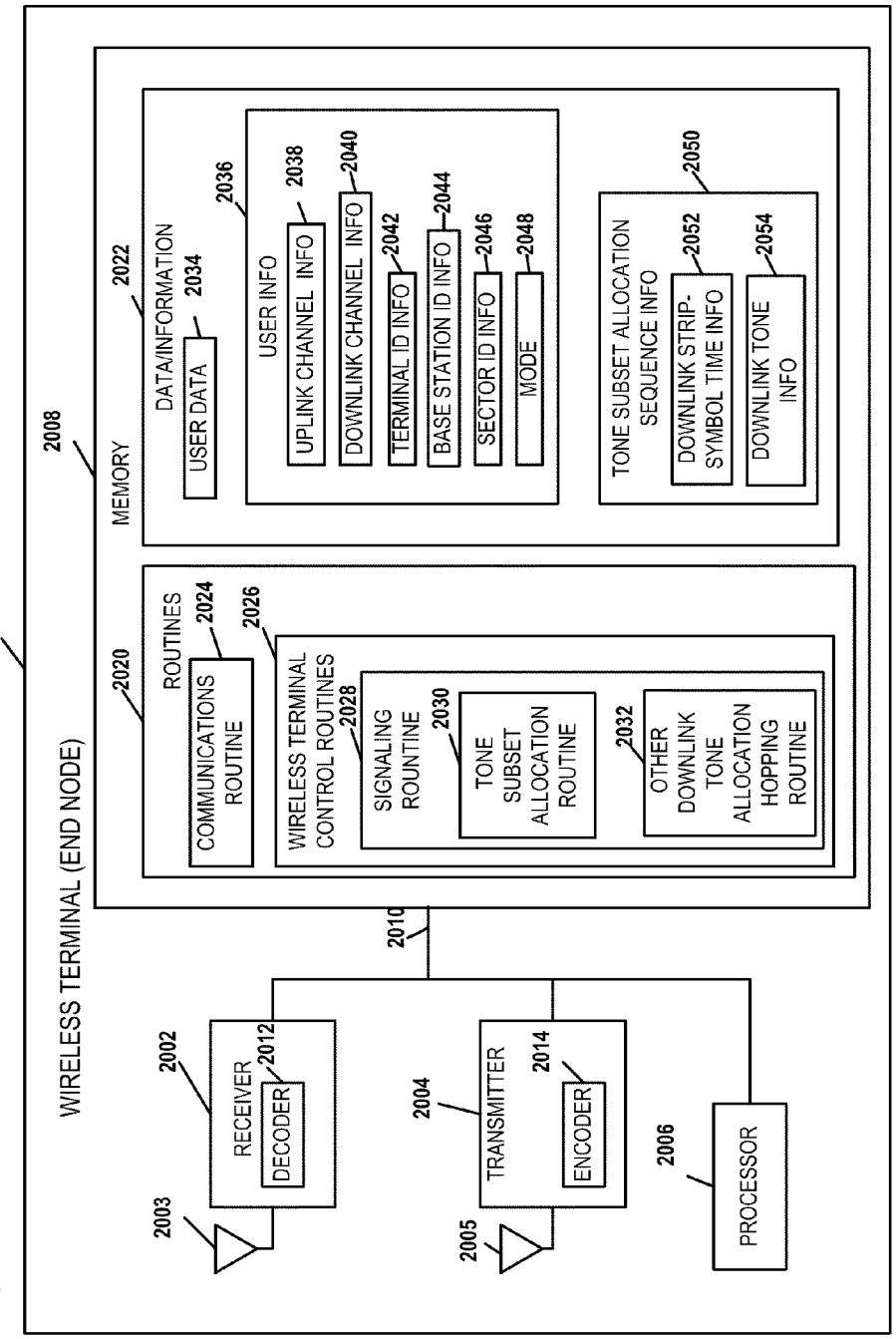
FIG. 20 is an illustration of an exemplary wireless terminal implemented in accordance with various aspects described herein.

FIG. 20 illustrates an example wireless terminal (end node) 2000 which can be used as any one of the wireless terminals (end nodes), e.g., EN(1) 1836, of the system 1800 shown in FIG. 18. Wireless terminal 2000 implements the tone subset allocation sequences. The wireless terminal 2000 includes a receiver 2002 including a decoder 2012, a transmitter 2004 including an encoder 2014, a processor 2006, and memory 2008 which are coupled together by a bus 2010 over which the various elements 2002, 2004, 2006, 2008 can interchange data and information. An antenna 2003 used for receiving signals from a base station (and/or a disparate wireless terminal) is coupled to receiver 2002. An antenna 2005 used for transmitting signals, e.g., to a base station (and/or a disparate wireless terminal) is coupled to transmitter 2004.

The processor 2006, e.g., a CPU controls the operation of the wireless terminal 2000 and implements methods by executing routines 2020 and using data/information 2022 in memory 2008.

Data/information 2022 includes user data 2034, user information 2036, and tone subset allocation sequence information 2050. User data 2034 may include data, intended for a peer node, which will be routed to encoder 2014 for encoding prior to transmission by transmitter 2004 to a base station, and data received from the base station which has been processed by the decoder 2012 in receiver 2002. User information 2036 includes uplink channel information 2038, downlink channel information 2040, terminal ID information 2042, base station ID information 2044, sector ID information 2046, and mode information 2048. Uplink channel information 2038 includes information identifying uplink channels segments that have been assigned by a base station for wireless terminal 2000 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 2040 includes information identifying downlink channel segments that have been assigned by a base station to WT 2000 for use when the base station is transmitting data/information to WT 2000. Downlink channels may include downlink traffic channels and assignment channels, each downlink channel including one or more logical tone, each logical tone following a downlink hopping sequence, which is synchronized between each sector of the cell.

User info 2036 also includes terminal ID information 2042, which is a base station-assigned identification, base station ID information 2044 which identifies the specific base station that WT has established communications with, and sector ID info 2046 which identifies the specific sector of the cell where WT 2000 is presently located. Base station ID 2044 provides a cell slope value and sector ID info 2046 provides a sector index type; the cell slope value and sector index type may be used to derive tone hopping sequences. Mode information 2048 also included in user info 2036 identifies whether the WT 2000 is in sleep mode, hold mode, or on mode.

Tone subset allocation sequence information 2050 includes downlink strip-symbol time information 2052 and downlink tone information 2054. Downlink strip-symbol time information 2052 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 2054 includes information including a carrier frequency assigned to the base station, the number and frequency of tones, and the set of tone subsets to be allocated to the strip-symbol periods, and other cell and sector specific values such as slope, slope index and sector type.

Routines 2020 include communications routines 2024 and wireless terminal control routines 2026. Communications routines 2024 control the various communications protocols used by WT 2000. Wireless terminal control routines 2026 controls basic wireless terminal 2000 functionality including the control of the receiver 2002 and transmitter 2004. Wireless terminal control routines 2026 include the signaling routine 2028. The signaling routine 2028 includes a tone subset allocation routine 2030 for the strip-symbol periods and an other downlink tone allocation hopping routine 2032 for the rest of symbol periods, e.g., non strip-symbol periods. Tone subset allocation routine 2030 uses user data/info 2022 including downlink channel information 2040, base station ID info 2044, e.g., slope index and sector type, and downlink tone information 2054 in order to generate the downlink tone subset allocation sequences in accordance with some aspects and process received data transmitted from the base station. Other downlink tone allocation hopping routine 2030 constructs downlink tone hopping sequences, using information including downlink tone information 2054, and downlink channel information 2040, for the symbol periods other than the strip-symbol periods. Tone subset allocation routine 2030, when executed by processor 2006, is used to determine when and on which tones the wireless terminal 2000 is to receive one or more strip-symbol signals from the base station 1900. The uplink tone allocation hopping routine 2030 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates a beacon-assisted handover from a wireless terminal, comprising:
   receiving, by a processor, a control message during an active communication with a base station, wherein the active communication is facilitated by a macro network via the base station;
   scanning a frequency identified in the control message;
   transmitting a report to the base station, wherein the report includes attributes associated with a beacon detected during the scanning of the frequency, wherein the attributes are based on a frame number of the beacon and a scrambling code of the beacon, and the scrambling code of the beacon corresponds to more than one femto cell; and
   receiving a command to perform a handover to an identified femto cell when the attributes correspond to an assigned unique identity of the femto cell, wherein the unique identity of the femto cell comprises an identifier selected from a cross product of a set of scrambling codes for femto cells allocated within a femto cell network, a set of scrambling codes for beacons allocated within the femto cell network, and an offset selected from a set of positive integers, and the frame number of the beacon and the scrambling code of the beacon are a function of the assigned unique identity.

2. The method of claim 1, wherein the attribute is a measurement associated with the beacon.

3. The method of claim 1, further comprising ascertaining a femto cell attribute associated with an operating frequency of the femto cell, wherein the report includes the femto cell attribute.

4. The method of claim 3, further comprising ascertaining a scrambling code associated with the operating frequency, wherein the femto cell attribute is the scrambling code, and the scrambling code of the femto cell is a function of the assigned unique identity.

5. The method of claim 4, wherein:
   the scrambling code of the femto cell is obtained from a first set of primary scramble codes HS:={hsc1, hsc2, . . . , hscK1}, where K1 denotes a number of primary scrambling codes allocated to a plurality of femto cells within a femto cell network;
   the scrambling code of the beacon is obtained from a second set of primary scramble codes BS:={bsc1, bsc2, . . . , bscK2}, where K2 denotes a number of available primary scrambling codes for beacons transmitted by the plurality of femto cells; and
   each of the plurality of femto cells is uniquely identified via obtaining an identifier, HNBID, from an equation as follows:
   HNBID:=HS×BS×$\Delta$:={(0,hsc1,bsc1), (0,hsc2, bsc2), . . . (255,hscK1,bscK2)}
   where $\Delta$: denotes an offset selected from a set of integers between 0 and 255.

6. The method of claim 1, wherein the frequency identified in the control message for the scanning is different than an operating frequency of the femto cell.

7. An apparatus that facilitates a beacon-assisted handover from a wireless terminal, comprising:
   a receiving component configured to receive a control message during an active communication with a base station, wherein the active communication is facilitated by a macro network via the base station;
   a scanning component configured to scan a frequency identified in the control message; and
   a transmitting component configured to transmit a report to the base station, wherein the report includes attributes associated with a beacon detected during the scanning of the frequency, wherein the attributes are based on a frame number of the beacon and a scrambling code of the beacon, wherein the scrambling code of the beacon corresponds to more than one femto cell,
   wherein the receiving component is configured to receive a command to perform a handover to an identified femto cell when the attributes correspond to an assigned unique identity of the femto cell, the unique identity of the femto cell comprises an identifier selected from a cross product of a set of scrambling codes for femto cells allocated within a femto cell network, a set of scrambling codes for beacons allocated within the femto cell network, and an offset selected from a set of positive integers, and the frame number of the beacon and the scrambling code of the beacon are a function of the assigned unique identity.

8. The apparatus of claim 7, further comprising an analysis component configured to ascertain a measurement associated with the beacon, wherein the attribute is the measurement.

9. The apparatus of claim 7, further comprising an analysis component configured to ascertain a femto cell attribute, wherein the femto cell attribute is associated with the operating frequency of the femto cell, and wherein the report includes the femto cell attribute.

10. The apparatus of claim 9, wherein the analysis component is configured to determine a scrambling code associated with the operating frequency, wherein the femto cell attribute is the scrambling code, and the scrambling code of the femto cell is a function of the assigned unique identity.

11. The apparatus of claim 10, wherein:
the scrambling code of the femto cell is obtained from a first set of primary scramble codes HS:={hsc1, hsc2, ..., hscK1}, where K1 denotes a number of primary scrambling codes allocated to a plurality of femto cells within a femto cell network;
the scrambling code of the beacon is obtained from a second set of primary scramble codes BS:={bsc1, bsc2, ..., bscK2}, where K2 denotes a number of available primary scrambling codes for beacons transmitted by the plurality of femto cells; and
each of the plurality of femto cells is uniquely identified via obtaining an identifier, HNBID, from an equation as follows:
HNBID:=HS×BS×Δ:={(0,hsc1,bsc1), (0,hsc2,bsc2), ... (255,hscK1,bscK2)}
where Δ: denotes an offset selected from a set of integers between 0 and 255.

12. The apparatus of claim 7, wherein the frequency identified in the control message for the scanning is different than an operating frequency of the femto cell.

13. A computer program product that facilitates a beacon-assisted handover from a wireless terminal, comprising:
a non-transitory computer-readable storage medium comprising code for causing at least one computer to:
receive a control message during an active communication with a base station, wherein the active communication is facilitated by a macro network via the base station;
scan a frequency identified in the control message;
transmit a report to the base station, wherein the report includes attributes associated with a beacon detected during the scanning of the frequency, wherein the attributes are based on a frame number of the beacon and a scrambling code of the beacon, wherein the scrambling code of the beacon corresponds to more than one femto cell; and
receive a command to perform a handover to an identified femto cell when the attributes correspond to an assigned unique identity of the femto cell, wherein the unique identity of the femto cell comprises an identifier selected from a cross product of a set of scrambling codes for femto cells allocated within a femto cell network, a set of scrambling codes for beacons allocated within the femto cell network, and an offset selected from a set of positive integers, and the frame number of the beacon and the scrambling code of the beacon are a function of the assigned unique identity.

14. The computer program product of claim 13, wherein the frequency identified in the control message for the scanning is different than an operating frequency of the femto cell.

15. The computer program product of claim 13, further comprising code for causing the at least one computer to:
ascertain a ferrite cell attribute associated with an operating frequency of the femto cell, wherein the report includes the femto cell attribute; and
ascertain a scrambling code associated with the operating frequency,
wherein the femto cell attribute is the scrambling code, the scrambling code of the femto cell is a function of the assigned unique identity, and
the scrambling code of the femto cell is obtained from a first set of primary scramble codes HS:={hsc1, hsc2, ..., hscK1}, where K1 denotes a number of primary scrambling codes allocated to a plurality of femto cells within a femto cell network;
the scrambling code of the beacon is obtained from a second set of primary scramble codes BS:={bsc1, bsc2, ..., bscK2}, where K2 denotes a number of available primary scrambling codes for beacons transmitted by the plurality of femto cells; and
each of the plurality of femto cells is uniquely identified via obtaining an identifier, HNBID, from an equation as follows:
HNBID:=HS×BS×Δ:={(0,hsc1,bsc1), (0,hsc2,bsc2), ... (255,hscK1,bscK2)}
where Δ: denotes an offset selected from a set of integers between 0 and 255.

16. An apparatus that facilitates a beacon-assisted handover from a wireless terminal, comprising:
means for receiving a control message during an active communication with a base station, wherein the active communication is facilitated by a macro network via the base station;
means for scanning a frequency identified in the control message;
means for transmitting a report to the base station, wherein the report includes attributes associated with a beacon detected during the scanning of the frequency, wherein the attributes are based on a frame number of the beacon and a scrambling code of the beacon, wherein the scrambling code of the beacon corresponds to more than one femto cell; and
means for receiving a command to perform a handover to an identified femto cell when the attributes correspond to an assigned unique identity of the femto cell, wherein the unique identity of the femto cell comprises an identifier selected from a cross product of a set of scrambling codes for femto cells allocated within a femto cell network, a set of scrambling codes for beacons allocated within the femto cell network, and an offset selected from a set of positive integers, and the frame number of the beacon and the scrambling code of the beacon are a function of the assigned unique identity.

17. The apparatus of claim 16, further comprising means for ascertaining a measurement associated with the beacon, wherein the attribute is the measurement.

18. The apparatus of claim 16, wherein the frequency identified in the control message for the scanning is different than an operating frequency of the femto cell.

19. The apparatus of claim 16, further comprising:
means for ascertaining a femto cell attribute associated with an operating frequency of the femto cell, wherein the report includes the femto cell attribute; and
means for ascertaining a scrambling code associated with the operating frequency,
wherein the femto cell attribute is the scrambling code, the scrambling code of the femto cell is a function of the assigned unique identity, and
the scrambling code of the femto cell is obtained from a first set of primary scramble codes HS:={hsc1, hsc2, ..., hscK1}, where K1 denotes a number of primary scrambling codes allocated to a plurality of femto cells within a femto cell network;
the scrambling code of the beacon is obtained from a second set of primary scramble codes BS:={bsc1, bsc2, ..., bscK2}, where K2 denotes a number of available primary scrambling codes for beacons transmitted by the plurality of femto cells; and each of the plurality of femto cells is uniquely identified via obtaining an identifier, HNBID, from an equation as follows:

$HNBID := HS \times BS \times \Delta := \{(0, hsc1, bsc1), (0, hsc2, bsc2), \ldots (255, hscK1, bscK2)\}$ where $\Delta$: denotes an offset selected from a set of integers between 0 and 255.

20. At least one processor for facilitating a beacon-assisted handover from a wireless terminal, comprising:

a first processor module for receiving a control message during an active communication with a base station, wherein the active communication is facilitated by a macro network via the base station;

a second processor module for scanning a frequency identified in the control message;

a third processor module for transmitting a report to the base station, wherein the report includes attributes associated with a beacon detected during the scanning of the frequency, wherein the attributes are based on a frame number of the beacon and a scrambling code of the beacon, wherein the scrambling code of the beacon corresponds to more than one femto cell; and a fourth processor module for receiving a command to perform a handover to an identified femto cell when the attributes correspond to an assigned unique identity of the femto cell, wherein the unique identity of the femto cell comprises an identifier selected from a cross product of a set of scrambling codes for femto cells allocated within a femto cell network, a set of scrambling codes for beacons allocated within the femto cell network, and an offset selected from a set of positive integers and the frame number of the beacon and the scrambling code of the beacon are a function of the assigned unique identity.

21. The at least one processor of claim 20, wherein the frequency identified in the control message for the scanning is different than an operating frequency of the femto cell.

22. The at least one processor of claim 20, further comprising:

a fifth processor module for ascertaining a femto cell attribute associated with an operating frequency of the femto cell, wherein the report includes the femto cell attribute; and a sixth processor module for ascertaining a scrambling code associated with the operating frequency, wherein the femto cell attribute is the scrambling code, the scrambling code of the femto cell is a function of the assigned unique identity, and the scrambling code of the femto cell is obtained from a first set of primary scramble codes $HS := \{hsc1, hsc2, \ldots, hscK1\}$, where K1 denotes a number of primary scrambling codes allocated to a plurality of femto cells within a femto cell network;

the scrambling code of the beacon is obtained from a second set of primary scramble codes $BS := \{bsc1, bsc2, \ldots, bscK2\}$, where K2 denotes a number of available primary scrambling codes for beacons transmitted by the plurality of femto cells; and each of the plurality of femto cells is uniquely identified via obtaining an identifier, HNBID, from an equation as follows:

$HNBID := HS \times BS \times \Delta := \{(0, hsc1, bsc1), (0, hsc2, bsc2), \ldots (255, hscK1, bscK2)\}$ where $\Delta$: denotes an offset selected from a set of integers between 0 and 255.

* * * * *